(12) United States Patent
Sabau et al.

(10) Patent No.: US 11,065,719 B2
(45) Date of Patent: Jul. 20, 2021

(54) LASER-INTERFERENCE SURFACE PREPARATION FOR ENHANCED COATING ADHESION

(71) Applicant: UT-BATTELLE, LLC, Oak Ridge, TN (US)

(72) Inventors: Adrian Sabau, Knoxville, TN (US); Claus Daniel, Knoxville, TN (US); Harry M. Meyer, III, Oak Ridge, TN (US); Jianlin Li, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 164 days.

(21) Appl. No.: 16/021,361

(22) Filed: Jun. 28, 2018

(65) Prior Publication Data

US 2018/0311770 A1 Nov. 1, 2018

Related U.S. Application Data

(63) Continuation-in-part of application No. 14/733,395, filed on Jun. 8, 2015, now Pat. No. 10,082,166.
(Continued)

(51) Int. Cl.
*B29C 65/16* (2006.01)
*B23K 26/352* (2014.01)
(Continued)

(52) U.S. Cl.
CPC ........ *B23K 26/352* (2015.10); *B23K 26/0006* (2013.01); *B23K 26/06* (2013.01); *B23K 26/067* (2013.01); *B23K 26/082* (2015.10); *B23K 26/083* (2013.01); *B23K 26/354* (2015.10); *B23K 26/3568* (2018.08); *B29C 65/16* (2013.01); *B29C 66/7422* (2013.01); *B23K 2101/006* (2018.08); *B23K 2103/10* (2018.08); *B29L 2031/3076* (2013.01)

(58) Field of Classification Search
CPC .. B23K 26/352; B23K 26/082; B23K 26/354; B23K 26/3568; B23K 26/0006; B23K 26/06; B23K 26/067; B23K 26/083; B29C 65/16; B29C 66/7422
See application file for complete search history.

(56) References Cited

U.S. PATENT DOCUMENTS 4,745,018 A * 5/1988 Chihara ................ B29C 59/16
428/141
4,758,307 A 7/1988 Pettigrew et al.
(Continued)

OTHER PUBLICATIONS

Warren et al.: "Laser Abalation Assisted Adhesive Bonding of Automotive Structural Composites." Oak Ridge National Laboratory, United States. Department of Energy. Office of Energy Research, United States. Department of Energy. Office of Scientific and Technical Information. United States. Department of Energy. Office of Energy Research, 1999.
(Continued)

*Primary Examiner* — Daniel McNally
(74) *Attorney, Agent, or Firm* — Fox Rothschild LLP

(57) ABSTRACT

A coated article includes a substrate having an interference laser-treated surface portion, and a single-stage coating adhered directly to the interference laser-treated surface portion. A system and method for making a coated article are also disclosed.

6 Claims, 27 Drawing Sheets

Related U.S. Application Data

(60) Provisional application No. 62/526,692, filed on Jun. 29, 2017, provisional application No. 62/132,296, filed on Mar. 12, 2015.

(51) Int. Cl.

| | | |
|---|---|---|
| *B23K 26/00* | (2014.01) | |
| *B23K 26/06* | (2014.01) | |
| *B29C 65/00* | (2006.01) | |
| *B23K 26/082* | (2014.01) | |
| *B23K 26/354* | (2014.01) | |
| *B23K 26/067* | (2006.01) | |
| *B23K 26/08* | (2014.01) | |
| *B29L 31/30* | (2006.01) | |
| *B23K 101/00* | (2006.01) | |
| *B23K 103/10* | (2006.01) | |

(56) References Cited

U.S. PATENT DOCUMENTS

| | | | | |
|---|---|---|---|---|
| 4,861,407 | A * | 8/1989 | Volkmann | B29C 59/16 156/272.8 |
| 5,284,538 | A | 2/1994 | Suzuki et al. | |
| 5,322,988 | A * | 6/1994 | Russell | B01D 53/007 216/65 |
| 5,478,424 | A * | 12/1995 | Timm | C09D 5/06 156/219 |
| 5,529,813 | A * | 6/1996 | Kobsa | B23K 26/0604 427/517 |
| 6,176,959 | B1 | 1/2001 | Clarke | |
| 2010/0143744 | A1* | 6/2010 | Gupta | H01L 21/02532 428/601 |
| 2016/0265570 | A1 | 9/2016 | Sabau et al. | |

OTHER PUBLICATIONS

Galantucci et al.: "Surface treatment for adhesive-bonded joints by excimer laser." Dipartimento di Progettazione e Jroduzione Ind. le Politecnico di Bad, Viale Jopigio 182,70126 Bad, Italy.

Spadaro C, Sunseri C, and Dispenza C., The influence of the nature of the surface oxide on the adhesive fracture energy of aluminium bonded joints as measured by T-peel tests. Int J Adhes Adhes 2007;76:1441-6.

Wong RCP, Hoult AP, Kim JK, Yu TX. Improvement of adhesive bonding in aluminium alloys using a laser surface texturing process. J Mater Process Technol 1997; vol. 63, pp. 579-584.

Walters CT, Laser surface preparation for adhesive bonding II. Report No. AFRL-ML-WP-TR-2006-4139; AFRL Wright-Patterson AFB, Ohio; 2004.

C. T. Walters, S. A. Siwecki, L. R. Dosser, C. J. Kershner, R. J. Hull, and B. E. Campbell, "Laser Removal of Contaminant Films from Metal Surfaces," Proceedings of ICALEO '96, held Oct. 14-17, 1996, LIA vol. 81, p. A-95.

C. T. Walters, "Laser-Based Cleaning Processes for Solvent Replacement," Proceedings of 42nd International SAMPE Symposium and Exhibition, held May 4-8, 1997, Anaheim, CA.

Critchlow GW, Brewis DM, Emmony DC, Cottam CA. Initial investigation into the effectiveness of CO2-laser treatment of aluminium for adhesive bonding, Int J Adhes. 1995; vol. 15, pp. 233-236.

Critchlow GW, Cottam CA, Brewis DM, Emmony DC. Further studies into the effectiveness of CO2-laser treatment of metals for adhesive bonding. Int J Adhes. 1997; vol. 17, pp. 143-150.

Yun IH, Kim WS, Kim K., Jung JM, Lee JJ, and Jung HT, "Highly enhanced interfacial adhesion properties of steel-polymer composites by dot-shaped surface patterning," Journal of Applied Physics, vol. 109, DOI: 10.1063/1.3567113, 2011.

Warren, C.D., and Paulauskas, F.L., "Laser Ablation Assisted Adhesive Bonding of Automotive Structural Composites," ICCM-12, Paris France, Jul. 3-9 (1999).

Hiroyuki Niino, Masashi Nakano, Shozaburo Nagano, Hideo Nitta, Keisuke Yano, Akira Yabe, Excimer Laser Ablation of Polymers and Carbon Fiber Composites, Journal of Photopolymer Science and Technology, vol. 3 (1990), pp. 53-56.

P. Molitor, V. Barron,T. Young, Surface treatment of titanium for adhesive bonding to polymer composites: a review International Journal of Adhesion and Adhesives, vol. 21, Issue 2, 2001, pp. 129-136.

Q. Bénard, M. Fois, M. Grisel, P. Laurens, Surface treatment of carbon/epoxy and glass/epoxy composites with an excimer laser beam, International Journal of Adhesion and Adhesives, vol. 26, Issue 7, Oct. 2006, pp. 543-549.

Belcher, M. A.; Wohl, C. J.; Hopkins, J. W.; Connell, J. W., Laser Surface Preparation and Bonding of Aerospace Structural Composites, SAMPE 2010 Conference; May 17-20, 2010; Seattle, WA; United States.

Belcher, M. A.; List, M.S., Wohl, C. J.; Ghose S., Watson, K.A., Hopkins, J. W.; Connell, J. W., Laser Surface Preparation for Adhesive Bonding of Ti-6AI-4V, SAMPE 2010; May 17-20, 2010; Seattle, WA; United States.

C. Daniel, F. Miicklich, Z. Liu, Periodical micro-nano-structuring of metallic surfaces by interfering laser beams, Appl. Surf. Sci. 208-209 (2003) 317-321.

C. Daniel, F. Miicklich, Quantification of periodical surface structures by white light interferometry, Prakt. Metallogr. 41 (2004) 6, 277-285 (Invited).

F. Miicklich, C. Daniel, A. Lasagni, F. Yu, Direct Surface Patterning Induced by Interfering Laser Beams, Mat. Res. Soc. Symp. Proc. vol. EXS-2 (2004) M11.1.

C. F. Miicklich, A. Lasagni, C. Daniel, Laser Interference Metallurgy—Periodic Surface Patterning and Formation of Intermetallics, Intermetallics 13 (2005) 3-4, 437-442.

C. Daniel, F. Miicklich, Micro-structural characterization of laser interference irradiated Ni—Al multi-films, Appl. Surf. Sci. 242 (2005) 140-146.

F. Miicklich, A. Lasagni, C. Daniel, Laser Interference Metallurgy—using interference as a tool for micro/nano structuring, Int. J. Mater Res. 97 (2006) 10, 1337-1344 (featured on cover and Werner Koster Prize 2007).

C. Daniel, Biomimetic structures for mechanical applications by interfering laser beams—more than only holographic gratings, J. Mater Res. 21 (2006) 2098-2105.

C. Daniel, N. B. Dahotre, Phase-Modulated Hierarchical Surface Structures by Interfering Laser Beams, Adv. Eng. Mater. Adv. Eng. Mater. 10 (2006) 8, 925-932.

C. Daniel, A. Lasagni, F. Miicklich, Stress and texture evolution of Ni/Al multi-film by laser interference irradiation, Surf. Coat. Technol. 180-181 (2004) 478-482.

Galantucci, LM; Gravina, A; Chita, G; Cinquepalmi, M, Surface treatment foradhesive-bonded joints by excimer laser, Composites Part A—Appl. Sci. andManuf., vol. 27, pp. 1041-1049, 1996.

Benard, Q.; Fois, M.; Grisel, M.; Laurens, P.; Joubert, F., Influence of the Polymer Surface Layer on the Adhesion of Polymer Matrix Composites, J. of Thermoplastic Comp. Mat., vol. 22, pp. 51-61, 2009.

Warren, C.D., Paulauskas, F.L., and Bowman, R.G., "Laser Ablation Assisted Adhesive Bonding of Automotive Structural Composites," ORNL/CP-102637, ICCM-12, Paris France, Jul. 3-9 (1999).

Lima, M. S. F.; Sakamoto, J. M. S.; Simoes, J. G. A.; Riva, R., Laser processing of carbon fiber reinforced polymer composite for optical fiber guidelines, Lasers in Manufacturing (2013).

Physics Procedia, Ed. by Emmelmann C; Zaeh MF; Graf T; Schmidt M, vol. 41, pp. 565-573, 2013.

Golru, S. Sharifi; Attar, M. M.; Ramezanzadeh, B., Effects of surface treatment of aluminium alloy 1050 on the adhesion and anticorrosion properties of the epoxy coating, Applied Surface Science, vol. 345, pp. 360-368, 2015.

Berger J,Holthaus MG, Pistillo N, Roch T, Rezwan K, and Lasagni AF, Appl Surf Sci 2011; vol. 257, pp. 3081-3087.

McDaniel C, Gladkovskaya O, Flanagan A, Rochev Y, and O'Connor GM, RSC Advances 2015; vol. 5, pp. 42548-42558.

Jeong Y-H, Choe H-C, Brantley WA, Thin Soild Films 2011; vol. 519, pp. 4668-4675.

(56) References Cited

OTHER PUBLICATIONS

Sabau A.S., C.D. Warren, Chen, J. Daniel C., D. Erdman, H. Meyer, T.R. Watkins, T. Skszeck, M.M. Caruso, and J. Staagaard, Presentation of project LM097 to the Annual Merit Review of the Vehicle Technology of DOE.

Lasagni, M. D'Alessandria, R. Giovanelli, and F. Mucklich, Advanced design of periodical architectures in bulk metals by means of Laser Interference Metallurgy, Applied Surface Science, vol. 254, 2007, pp. 930-936.

Costil S, Lamraoui A, Langlade C, Heintz O, and Oltra R, Appl Surf Sci 2014; vol. 288, pp. 542-549.

ASTM: Standard Test Methods for Measuring Adhesion by Tape Test, Jun. 21, 2014 West Conshohocken, PA.

\* cited by examiner

LASER-INTERFERENCE SURFACE PREPARATION FOR ENHANCED COATING ADHESION

CROSS-REFERENCE TO RELATED APPLICATIONS

This application claims priority to U.S. Provisional Patent Application Ser. No. 62/526,692 filed on Jun. 29, 2017, entitled "Laser-Interference Surface Preparation for Enhanced Coating Adhesion", and is a continuation-in-part of U.S. application Ser. No. 14/733,395 filed Jun. 8, 2015, which claims the benefit of U.S. Provisional Application No. 62/132,296 filed Mar. 12, 2015, both entitled "Laser Nanostructured Surface Preparation for Joining Materials" the disclosures of which are incorporated herein by reference in their entireties.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

This invention relates to surface preparation for coating application, and more particularly to methods for applying coatings for enhanced coating adhesion.

BACKGROUND OF THE INVENTION

Aluminum surfaces contain native oxides and lubricant oils, which are residual from their forming/molding operations but are detrimental to coating and paints. Surface treatments aim to modify the Al surface to attain contaminant removal, wettability with primer, and roughened or textured surfaces. Increasing the surface roughness was found to be an important factor in enhancing the adhesion of an epoxy coating on Al 1050 alloy. To date, the aluminum-skinned aircraft surface preparation techniques include chemical conversion coated (MIL-PRF-5541) or anodized prior to application of coating systems. Chemical conversion coatings usually employ chromate solutions, often hexavalent chrome (Type I), and are highly toxic. Even when trivalent chrome is used (Type II) the clean-up and disposal of process waste is an added expense. Anodization processes are much more environmentally friendly, but because they are electrochemical processes, they are still expensive to maintain and operate. In addition, both chemical conversion and anodization are multi-step, complex processes.

One-beam laser pre-treatment of surfaces is now a widely accepted technique. These one-beam laser treatments have been successfully used on glass, ceramic (i.e. oxide), polymer, and metal surfaces. Materials respond to electromagnetic radiation primarily based on their electronic structure. The electric field vector is interacting with orbiting electrons. For metals, where a free electron cloud is dominating the electronic structure of the material, the electromagnetic wave is transformed quickly to phonons. These treatments have been used for a variety of applications, including surface texturing (dimpling), surface roughening (via ablation), increasing bio-compatibility, alteration of wettability, tribology, modification of microstructure, and creating surfaces with reduced reflection.

However, the use of traditional one-beam lasers in surface preparation was found to yield melt cavities with micro-cracks on aluminum alloy surfaces. Advances in laser technology over the past decade have overcome some of the melt cavity and micro-crack issues by using shorter pulse durations. However, the one-beam laser pathways produce geometrical features (e.g., either line scan width for scanning or dimple for single laser shots) whose sizes are given by the laser spot size severe limiting their productivity and final usage.

SUMMARY OF THE INVENTION

A coated article includes a substrate having an interference laser-treated surface portion and a single-stage coating adhered directly to the interference laser-treated surface portion. The interference laser-treated surface portion comprises features comprising at least one selected from the group consisting of alternating depressions or channels.

The features can have a periodicity. The periodicity can be between 0.5-50 μm. The periodicity can be selected to vary by no more than ±5%. The interference laser can be a multiple-beam interference laser, wherein an original laser beam is split into at least 2 beams which are then refocused over the same spot on the component surface.

A coated article treated according to the invention can have coating adhesion testing ranking results that are equal or greater than those of baseline coating adhesion of an article that has not been treated according to the invention.

The substrate can include an aluminum material having a native oxide layer prior to surface treatment and newly grown interference laser-treated oxide layer after surface treatment. The interference laser-treated oxide layer can contain a greater atomic percent of aluminum oxide than the native oxide layer contains.

A method of making a coated article includes the steps of treating a surface of a first substrate of the article with an interference laser to create an interference laser-treated surface portion, and applying a coating over the interference laser-treated surface portion. The interference laser-treated surface portion has features comprising at least one selected from the group consisting of alternating depressions or channels.

The method can include creating features having a periodicity, and wherein the periodicity is between 0.5-50 μm. The method can include the step of adjusting the periodicity such that the periodicity varies by no more than ±5%.

The method can include utilizing an interference laser with a multi-beam interference laser output, and wherein an original laser beam is split into at least 2 beams which are then refocused over the same area on the component surface.

The method can include adjusting the interference laser output to between 1-50 laser pulses per spot. The interference laser treating can comprise interference laser-component translation with speeds between 1 to 500 mm/s. The wavelength of light produced by the interference laser can be 180-2000 nm.

The method of the invention can further include treating a surface portion of a second substrate with an interference laser to create a second laser-treated surface portion. A second coating is applied to the second laser-treated surface portion. An adhesive is applied between the coating and the second coating to join the substrate to the second substrate. The interference laser-treated surface portion of the substrate and the interference laser-treated surface portion of the second substrate can be dissimilar materials.

The coating applied to the interference laser treated surface portion can be a primer layer, and another coating can be applied and adhered to the primer layer.

A coated article treated according to the invention can have coating adhesion testing ranking results that are equal or greater than those of baseline coating adhesion of an article that has not been treated according to the invention with an interference laser.

A system for preparing a surface of an article for a coating includes an interference laser system configured such that an original laser beam is split into at least 2 beams which are then refocused over the same spot on a surface portion of the article to create an interference laser-treated surface over the focused spot on the article. A registration device registers the position of the interference laser system relative to the surface spot. A drive moves at least one of the interference laser system and the surface relative to each other to apply features to the next surface focused spot of each component.

BRIEF DESCRIPTION OF THE DRAWINGS

There are shown in the drawings embodiments that are presently preferred it being understood that the invention is not limited to the arrangements and instrumentalities shown, wherein:

FIG. 2A is as-received and FIGS. 2B and 2C are laser-interference processed with in FIG. 2B, 2 shots-per-spot (a1_ag1_p1_2s), and in FIG. 2C, 8 shots-per-spot (a1_ag1_p1_8s).

DETAILED DESCRIPTION OF THE INVENTION

Figure 1A:
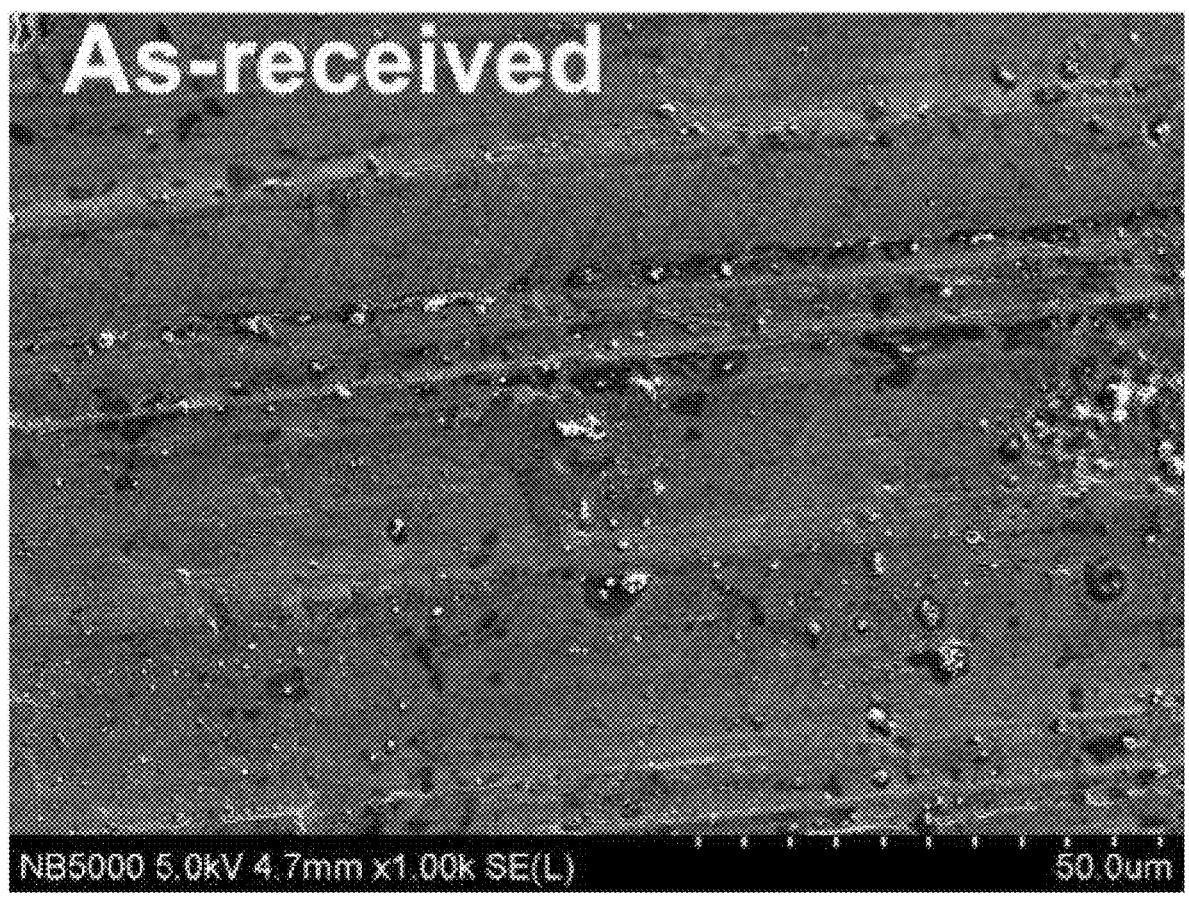
FIGS. 1A-1E are Field Emission Scanning Electron Microscopy (FESEM) images of laser structured surfaces of Al 2024-T3.
Figure 1B:
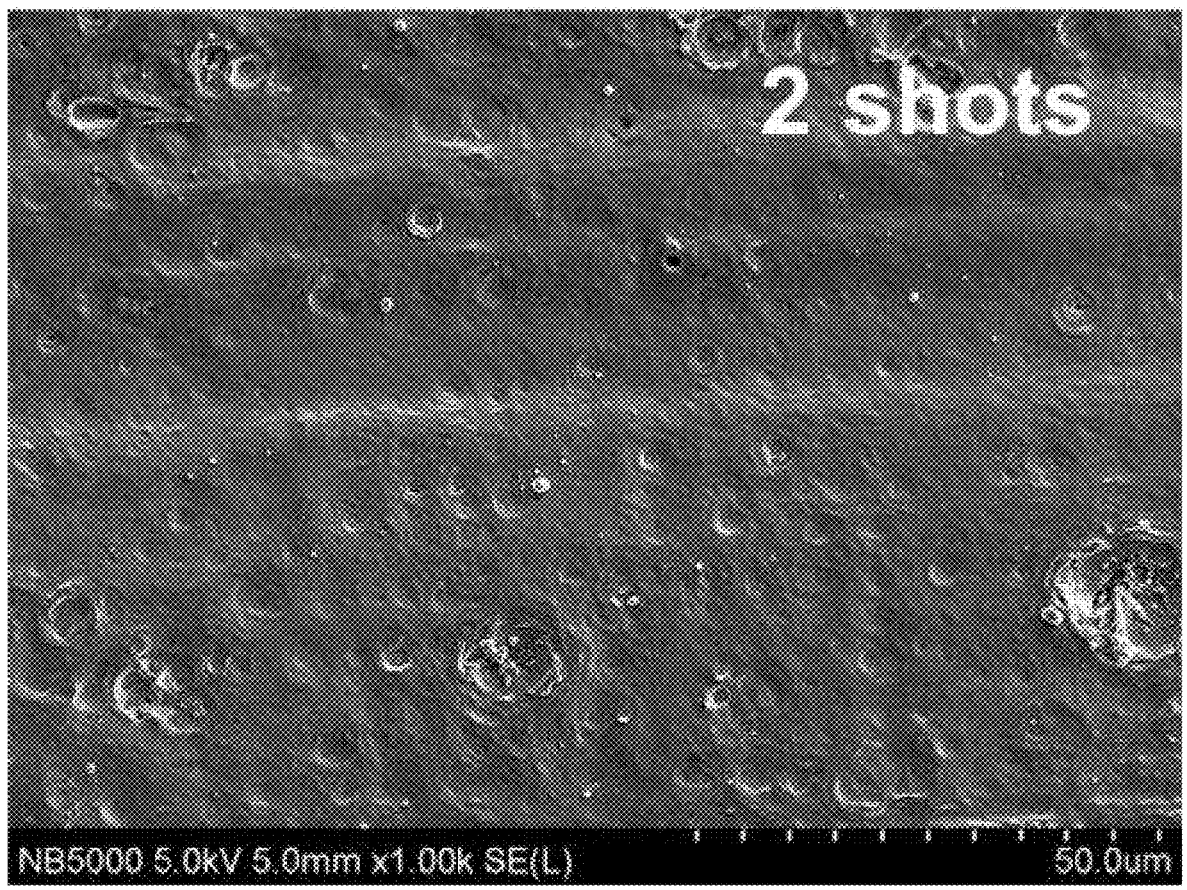
Figure 1C:
Figure 1D:
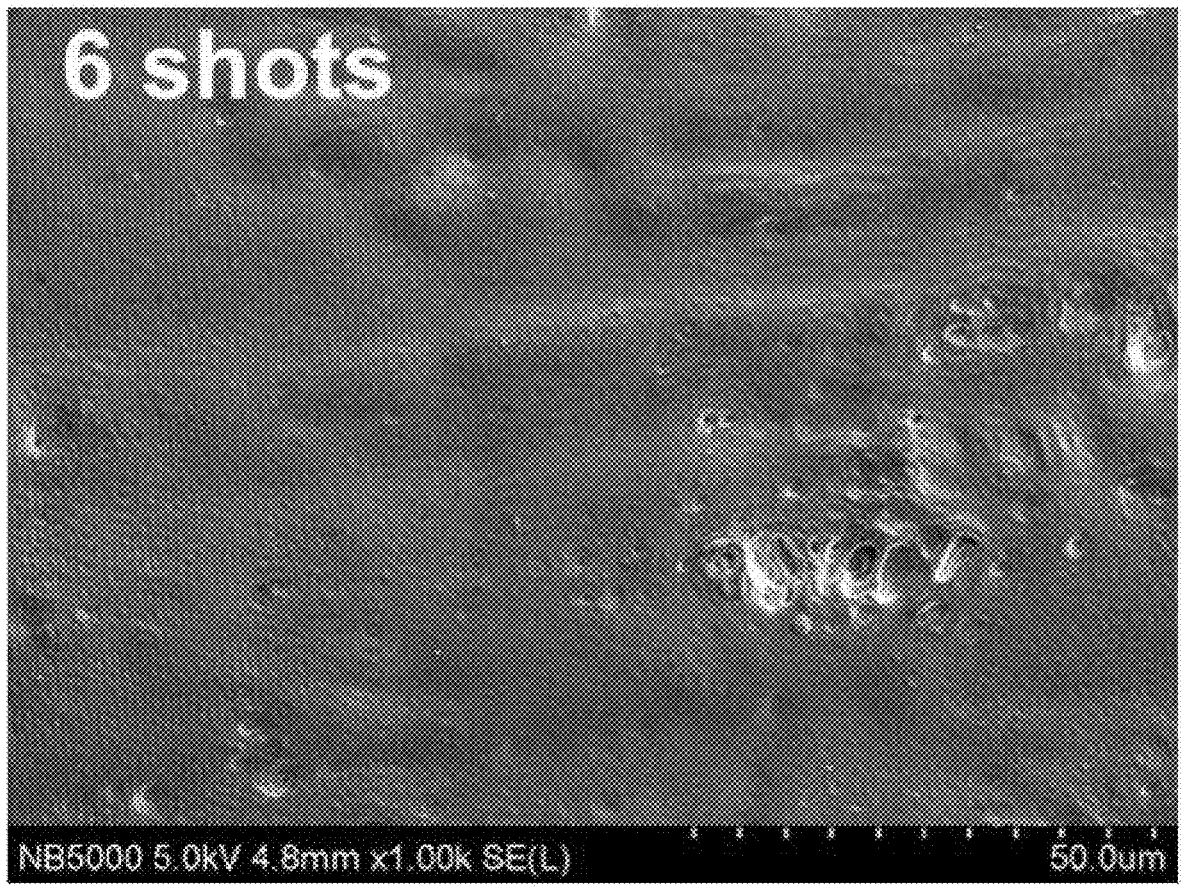
Figure 1E:
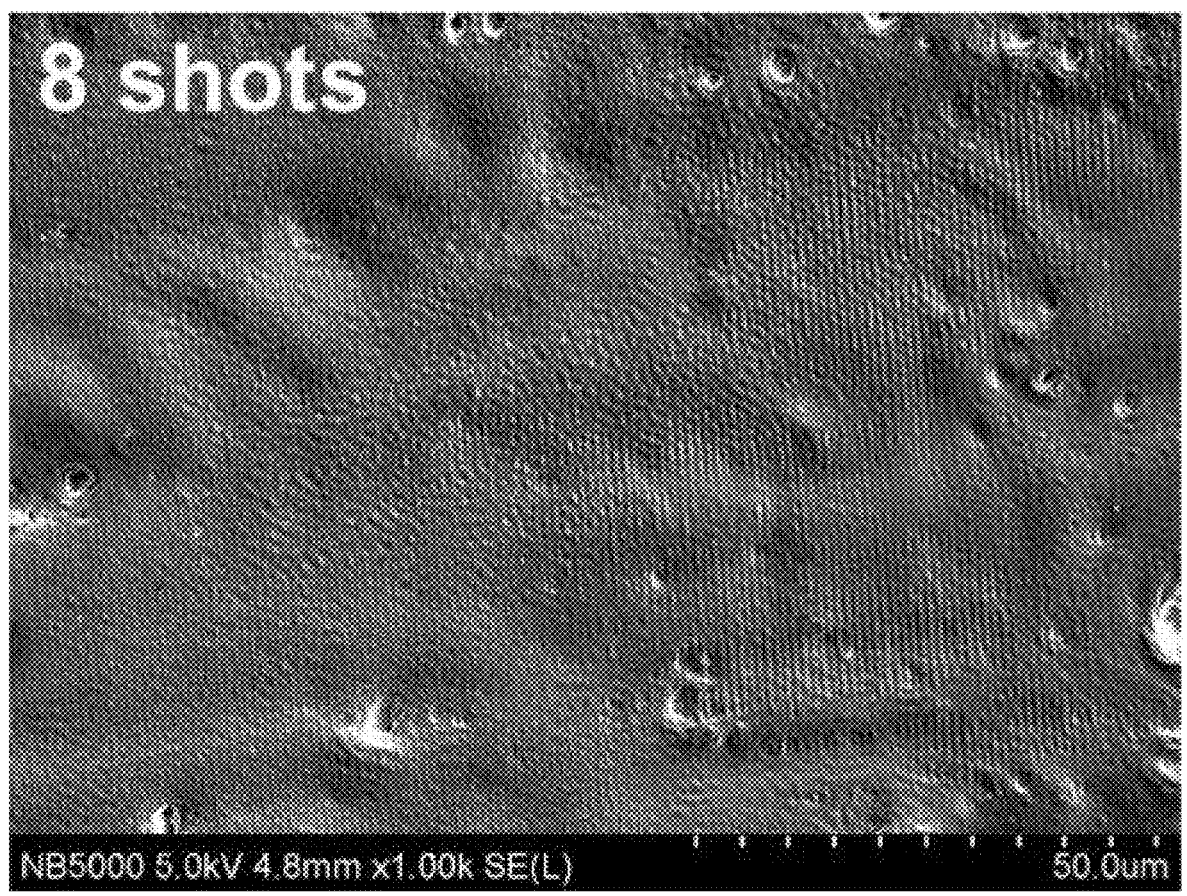

A coated article includes a substrate having an interference laser-treated surface portion and a single-stage coating adhered directly to the interference laser-treated surface portion. The interference laser-treated surface portion comprises features comprising at least one selected from the group consisting of alternating depressions or channels.

The interference laser and application process can vary. The features can have a periodicity that can be varied. The periodicity can be between 0.5-50 µm. The periodicity can be selected to vary by no more than ±5%. The interference laser can be a multiple-beam interference laser, wherein an original laser beam is split into at least 2 beams which are then refocused over the same spot on the component surface. The two-beam interference allows the use of a very large laser beam spot size at the specimen surface between 2 mm to 8 mm.

The coated article of the invention provides improved adhesion of the coating to the substrate of the article. The coated article treated according to the invention has a coating adhesion ranking results that are equal or greater than those of baseline coating adhesion of an article that has not been treated according to the invention. Improved adhesion of the coating is seen over other established surface preparation techniques such as grit blasting, chemical conversion coatings, or anodization.

The invention can be utilized with a variety of substrates, including metals, glass, ceramics and polymeric substrates. The invention would have the greatest value to articles that involve either expensive or toxic surface preparation techniques, such as anodization and chemical conversion coatings, respectively. Specific applications include, without limitation, aircraft, ships, and automotive or which the use of this laser-based non-chemical process for surface preparation will drastically reduce environmental impact, risks, and costs. The substrate can include an aluminum material having a native oxide layer prior to surface treatment and newly grown interference laser-treated oxide layer after surface treatment. The interference laser-treated oxide layer can contain a greater atomic percent of Aluminum Oxide than the native oxide layer contains. An improved aluminum oxide layer will impart greater corrosion resistance to the article.

A method of making a coated article includes the steps of treating a surface of a first substrate of the article with an interference laser to create an interference laser-treated surface portion, and applying a coating to the interference laser-treated surface portion. The interference laser-treated surface portion comprises features comprise at least one selected from the group consisting of alternating depressions or channels. The interference laser can be adjusted to create features with a periodicity varying between 0.5-50 µm, and such that the periodicity varies by no more than ±5%.

The operating characteristics of the laser interference system can be varied. The laser can be adjusted such that the interference laser output is between 1-50 laser pulses per spot. The interference laser system can provide for interference laser-component relative translation with speeds between 1 to 500 mm/s. The wavelength of light produced by the interference laser can be 180-2000 nm. The power output of the laser can also vary. The beam spot size at the specimen surface can also vary. This technique allowed the use of very large beam spot size at the specimen surface of up to 8 mm.

The method of the invention can further include treating a surface portion of a second substrate with an interference laser to create a second laser-treated surface portion. A second coating can be applied to the second laser-treated surface portion. An adhesive can be applied between the coating and the second coating to join the substrate to the second substrate. The interference laser-treated surface portion of the substrate and the interference laser-treated surface portion of the second substrate can be dissimilar materials.

The coating applied to the interference laser treated surface portion can vary. The proposed technique is applicable for example to any coating that require as surface preparation anodization, chemical conversion coatings, and other abrasive methods (grit blasting, abrasion). The coating can also be a primer layer, and another coating can then be applied and adhered to the primer layer. This can be desirable where the desired surface coating and the substrate do not exhibit good direct adhesion.

A substrate of Al 2024-T3 was used to test the invention. Al 2024-T3 is an Al—Cu alloy that is widely used in aircraft, but due to poor corrosion resistance must be coated with a surface coating of some kind. The composition of 2024 aluminum includes 4.3-4.5% Cu, 0.5-0.6% Mn, 1.3-1.5% Mg and less than a half a percent of Si, Zn, nickel, Cr, Pb and Bi. Al 2024-T3 has been tempered with an ultimate tensile strength of 400-430 MPa (58-62 ksi) and yield strength of at least 270-280 MPa (39-40 ksi). It has an elongation of 10-15%. The specimens were laser structured in spot-by-spot mode, in which the laser fired several shots while the specimen was held in place, and raster mode, in which the specimen was simply moved at a constant speed.

Several Al 2024-T3 specimens were laser structured in spot-by-spot mode, in which the laser fired several shots while the specimen was held in place, and raster mode, in which the specimen was simply moved at a constant speed. The specimens were labeled as a #_ag #_p #_#s(r), where: a #=Al 2024, Diameter ID, ag #=beam angle ID, p #=power level ID, #s=number of shots for spot-by-spot laser processing, #r=beam speed for raster laser processing. Laser-interference processing conditions for Al 2024 specimens that were used for STEM imaging and XPS analysis (laser power 3.5 W, wavelength 355 nm, spot size 6 mm, beam angle 12° which results in an interference-based periodicity spacing 1.7 µm). These are shown in Table 1.

TABLE 1

| Spot-by-spot Specimen | number shots | speed [mm/s] | Characterization |
|---|---|---|---|
| a1_ag1_p1_2s | 2 | 0 | XPS, STEM |
| a1_ag1_p1_8s | 8 | 0 | XPS, STEM |
| a1_ag1_p1_4r | 0 | 2 | XPS |
| a1_ag1_p1_8r | 0 | 8 | XPS |

FIG. 1 is a series of Field Emission Scanning Electron Microscopy (FESEM) images of laser structured surfaces of Al 2024-T3, showing that the laser-interference technique of the invention reduces the sharp features from the as-received rolling surface, minimizing surface defects. This is shown for as received, 2-shots, 4-shots, 6-shots and 8-shots of the laser.

FIG. 1 shows that the laser-interference technique is "smoothing-out" all the sharp features from the as-received rolling surface, in contrast to micro-cracking of Al alloy surfaces that were reported in the literature around melt cavities produced with traditional one-beam laser surface structuring. Micro cracking of Al-alloy surfaces are seen around melt cavities produced with traditional one-beam surface structuring.

The surface and subsurface of the Al 2024-T3 specimens in the as-received and laser-interference processed conditions were characterized using x-ray photoelectron spectroscopy (XPS), scanning transmission electron microscopy (STEM), and electron energy dispersive spectroscopy (EDS). The XPS characterization was used to assess the effectiveness of the removal of surface contaminants from both alloy surfaces as well as the characterization of the oxide growth.

FIGS. 2, 3, and 4 show the laser-structured Al 2024 specimens. The STEM images indicate that the laser-interference processing reduced the formation of CuMn-rich precipitates over a 500 and 800 nm depth from top surface for the specimen structures with 2 and 8 laser shots, respectively. The dissolution of these Cu-rich precipitates is thought in industry as a means to increase the corrosion resistance of Al 2024 alloy.

Figure 2A:
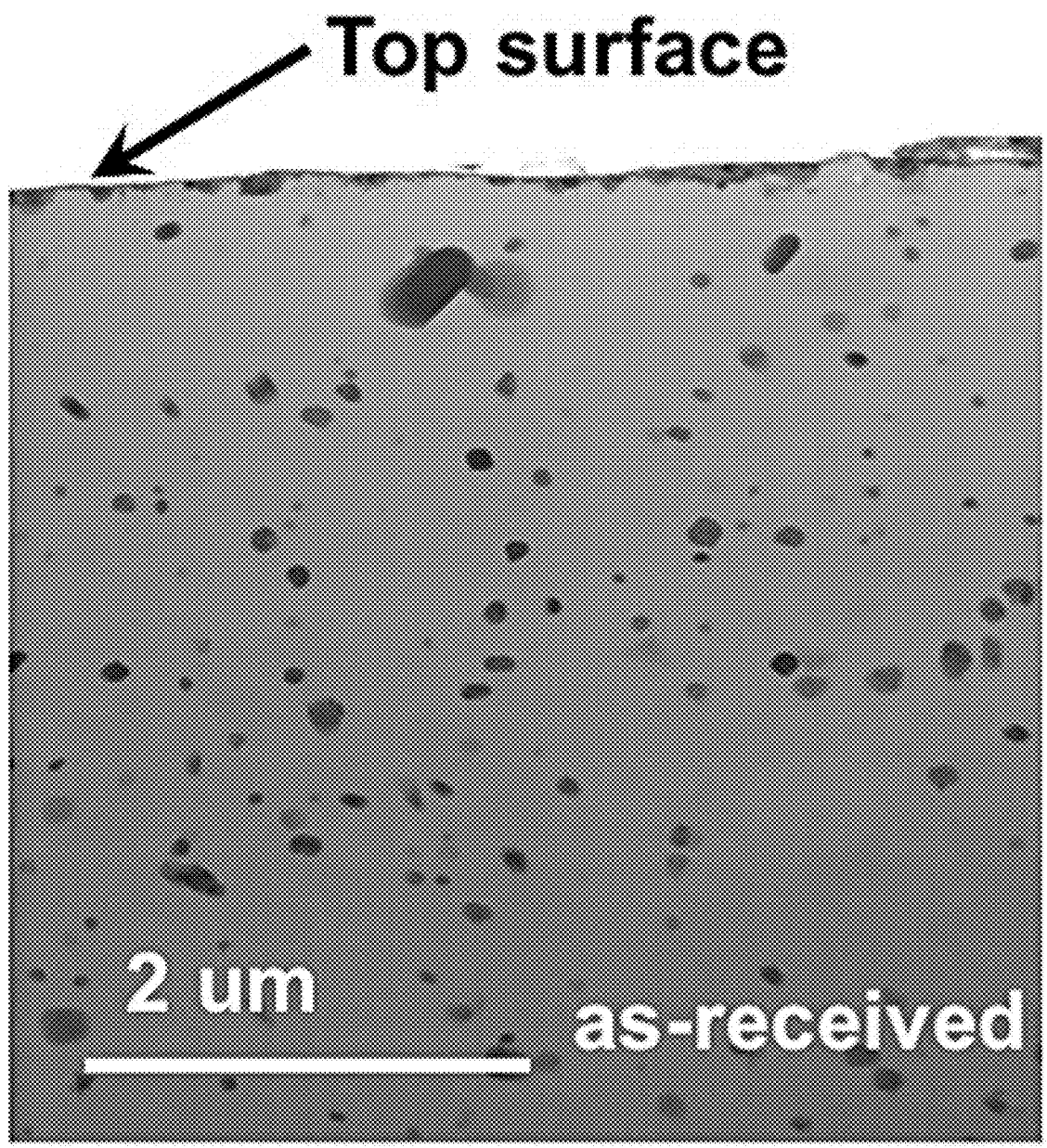
FIGS. 2A-2C are scanning transmission electron micrographs (STEM) showing distribution of precipitates (black or dark gray colors) in vertical cross-sections near the top surface for Al2024-T3 specimens.
Figure 2B:
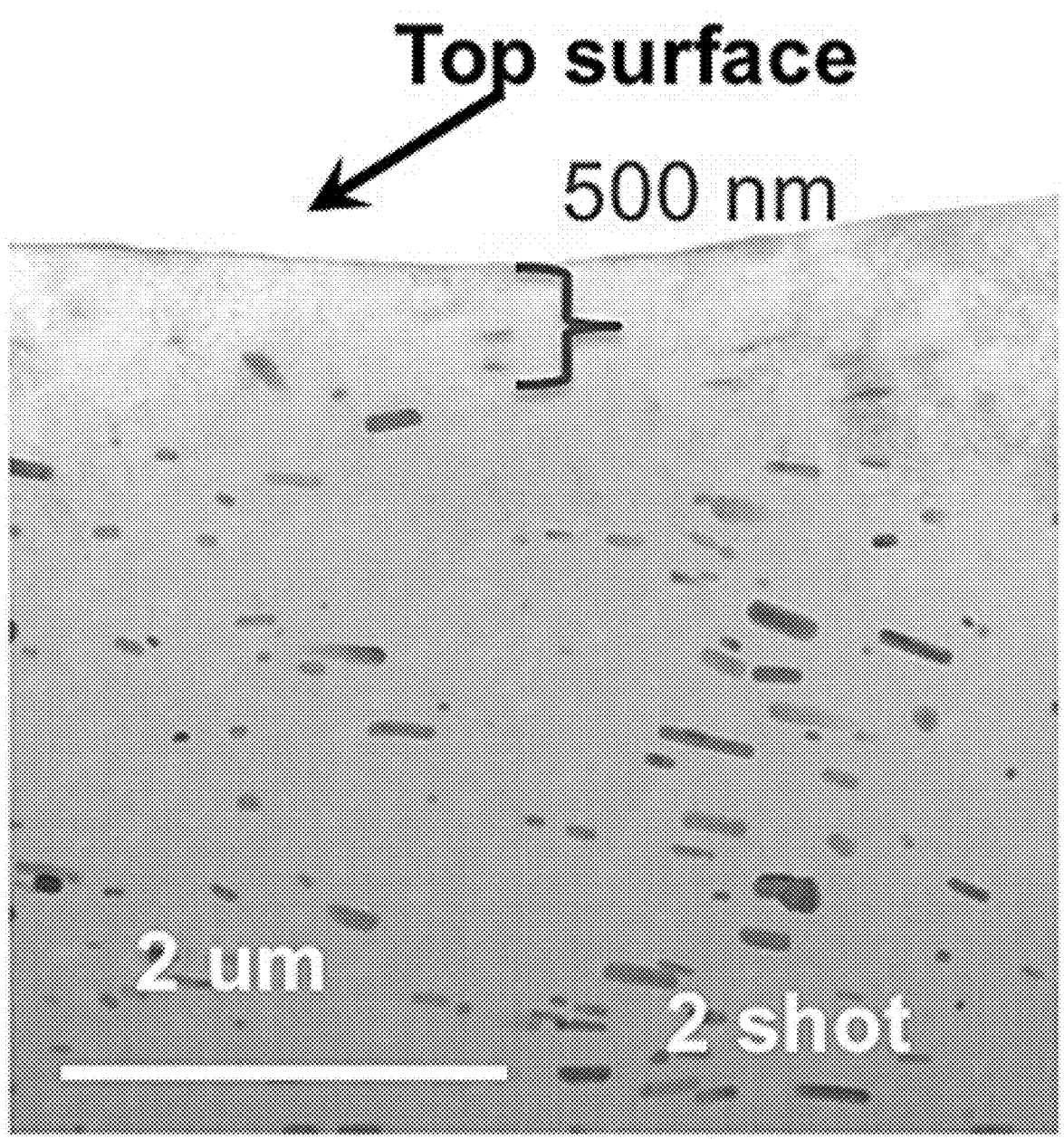
Figure 2C:
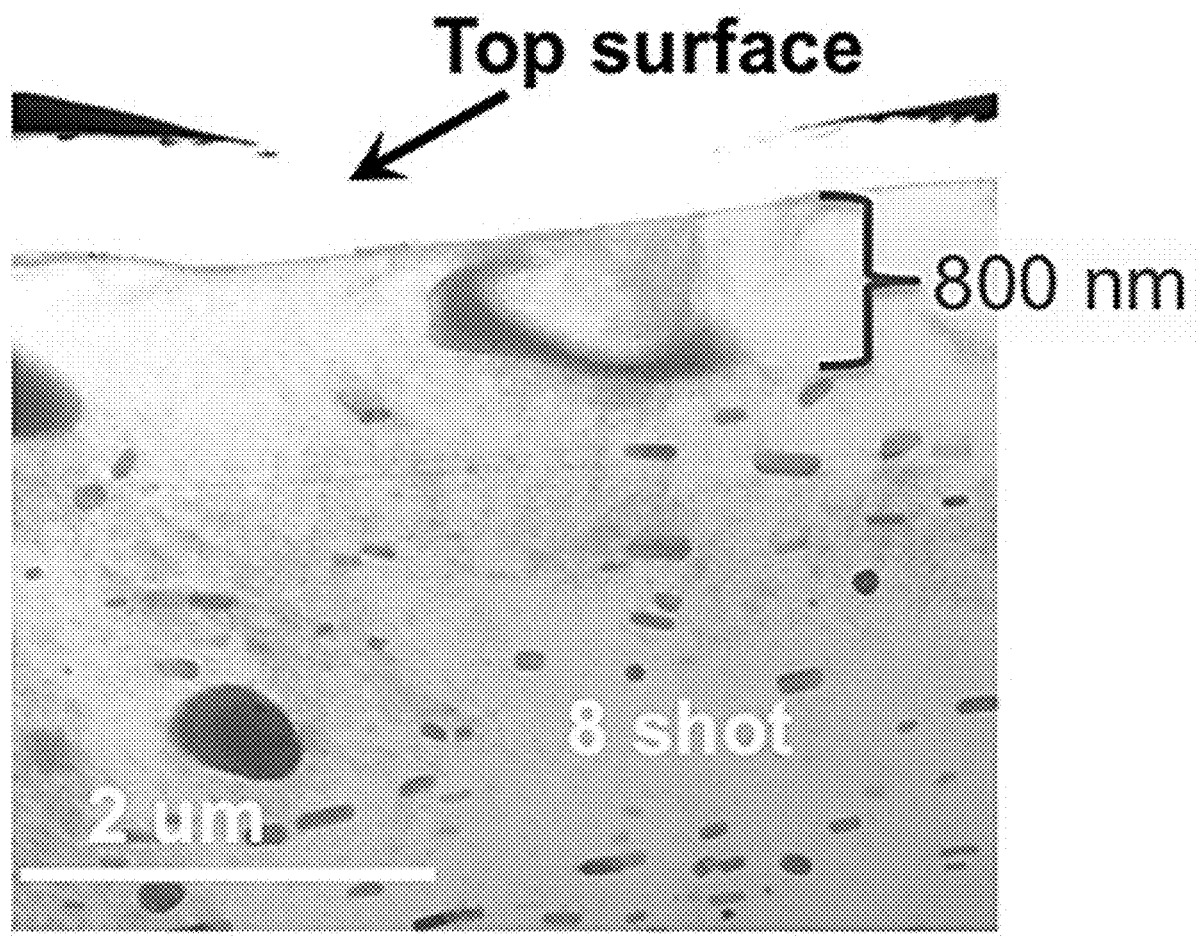
Figure 3A:
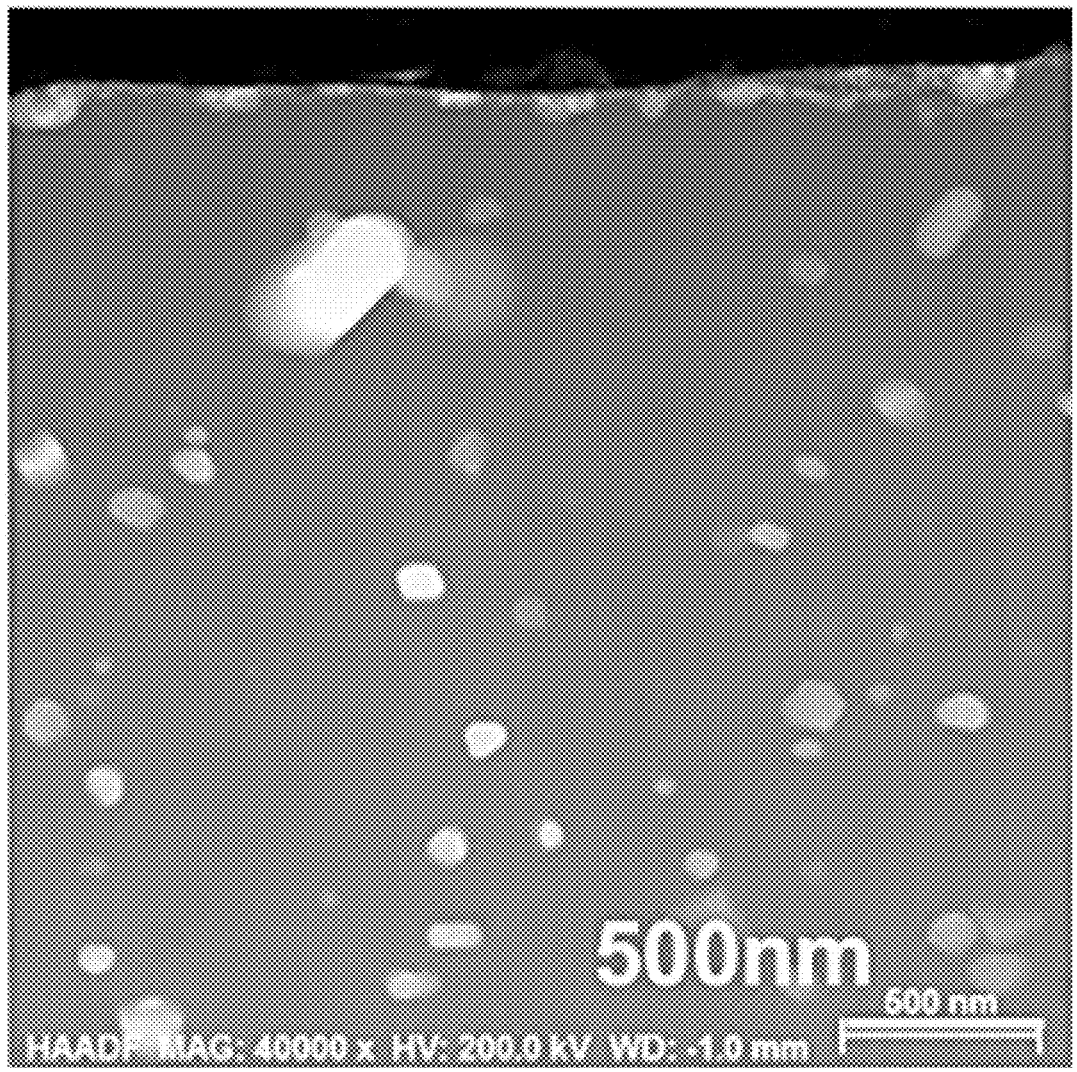
FIGS. 3A-3G show maps for HAADF STEM image for elements Al, Cu, Fe, Mg, Mn, and O for the as-received Al 2024-T3 specimen (without any laser processing).
Figure 3B:
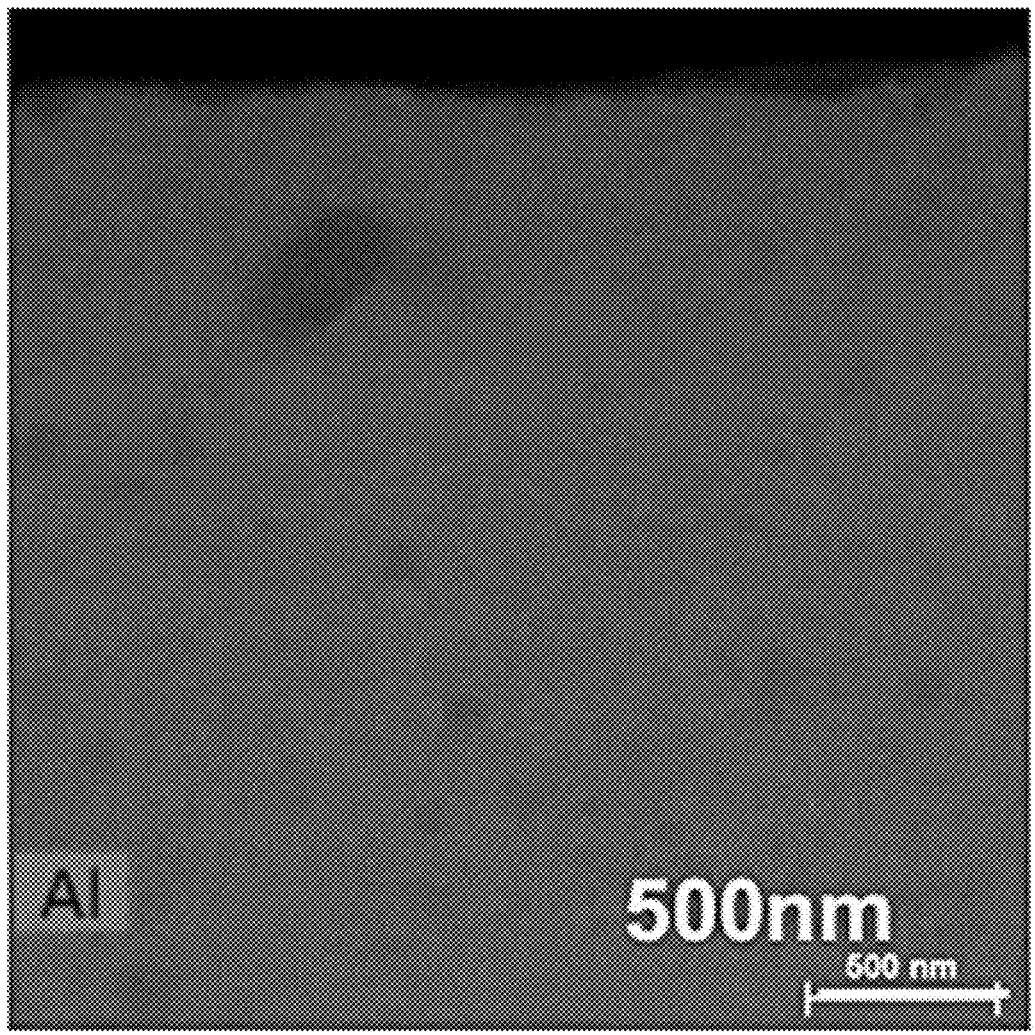
Figure 3C:
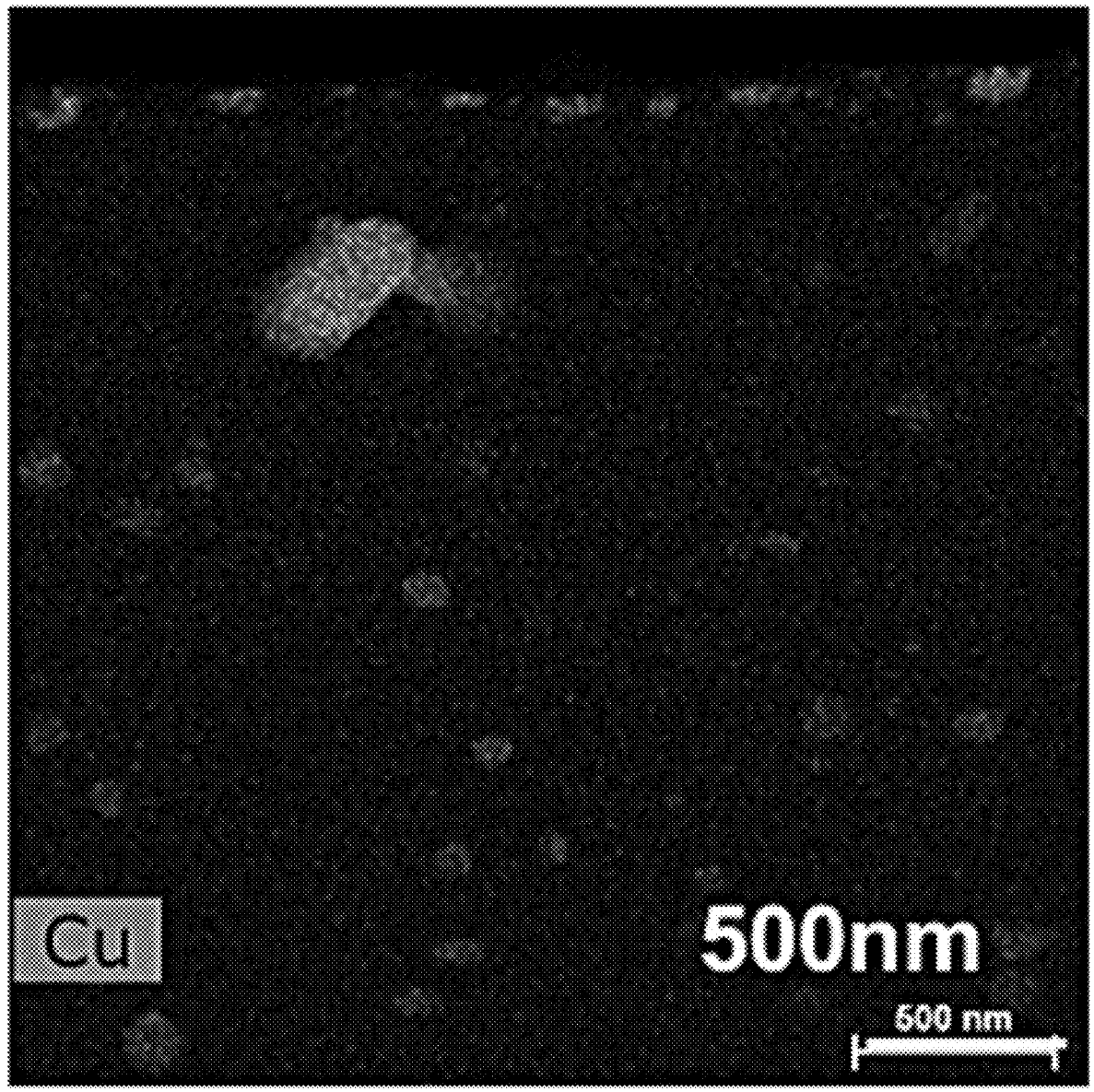
Figure 3D:
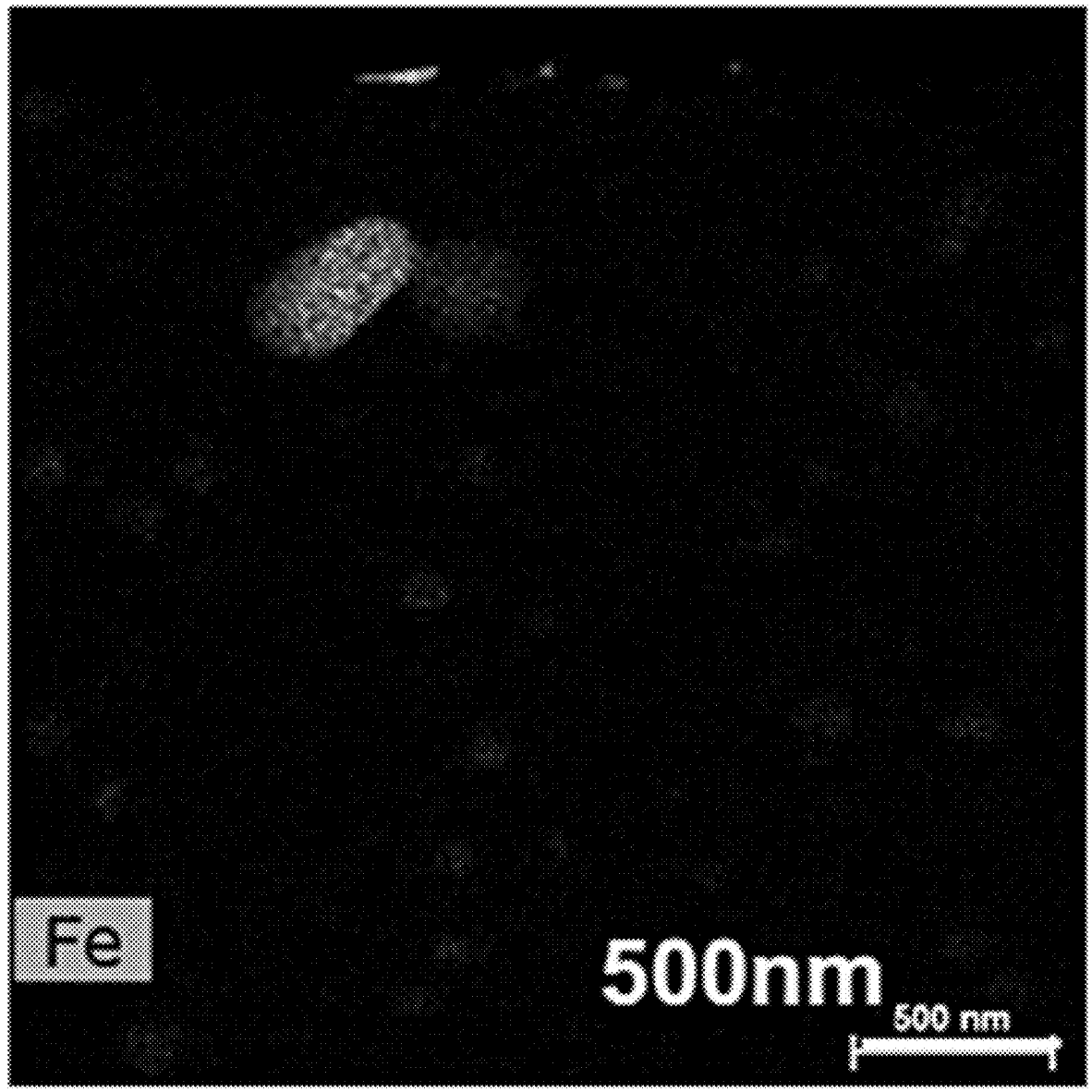
Figure 3E:
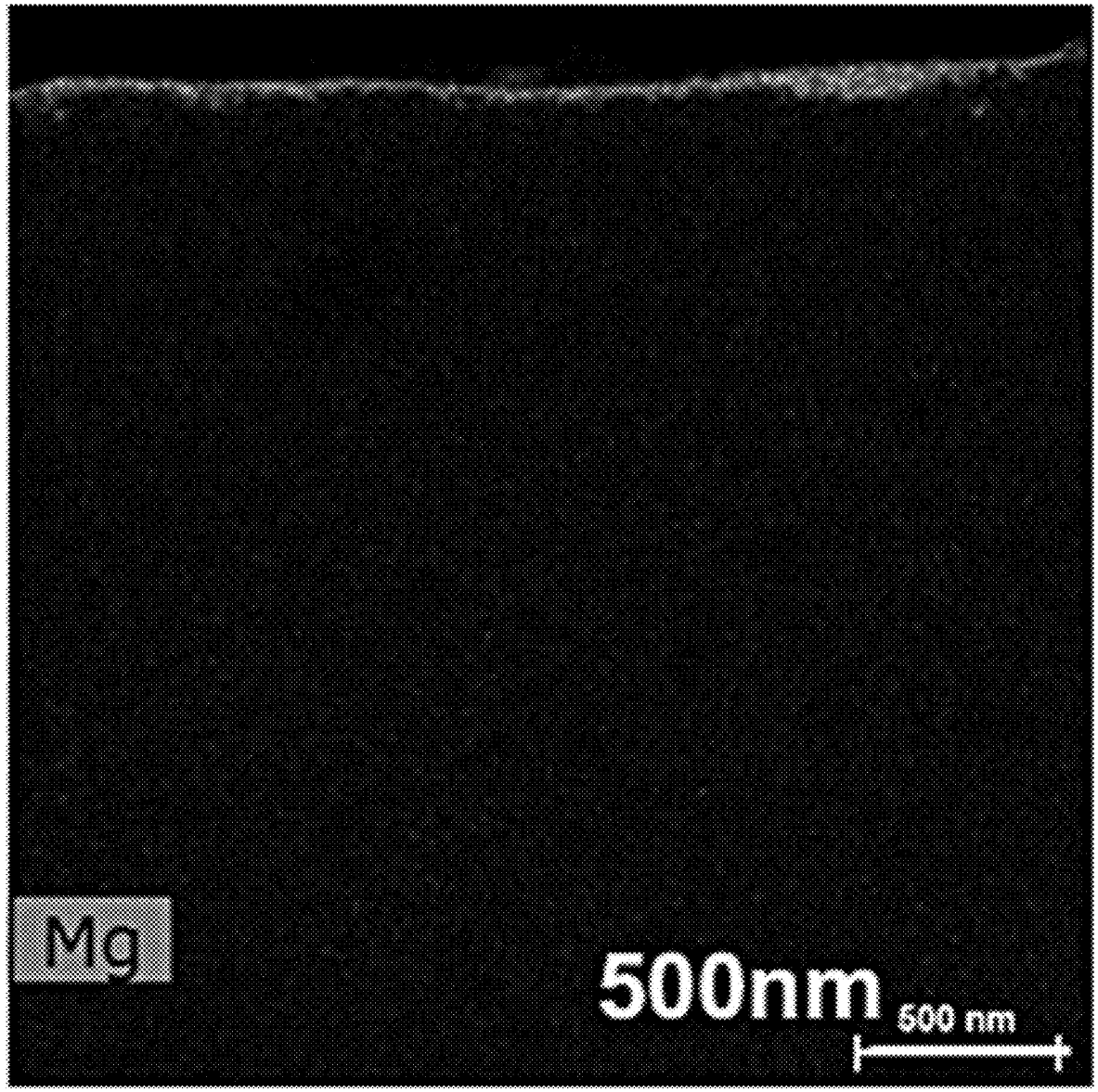
Figure 3F:
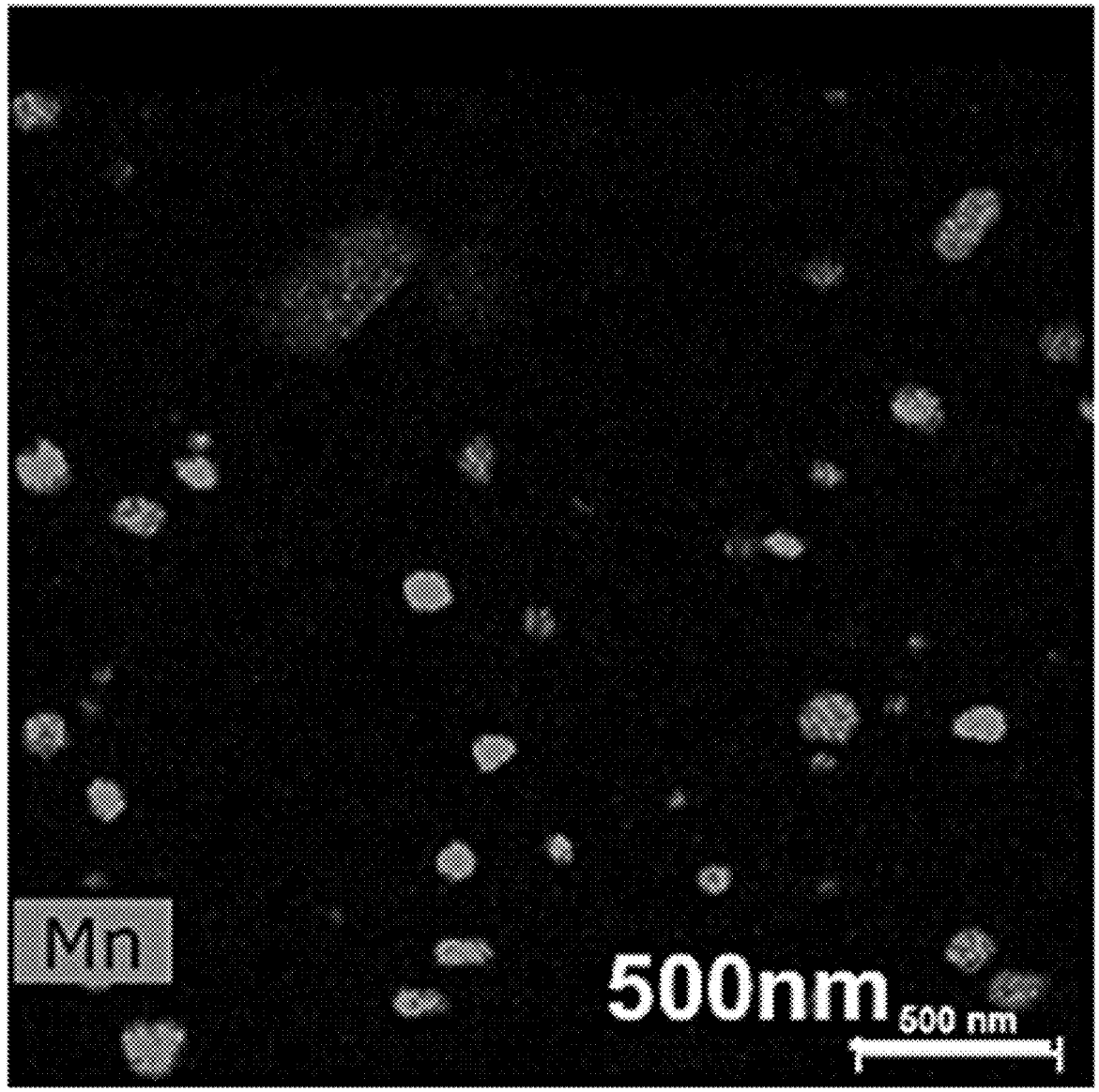
Figure 3G:
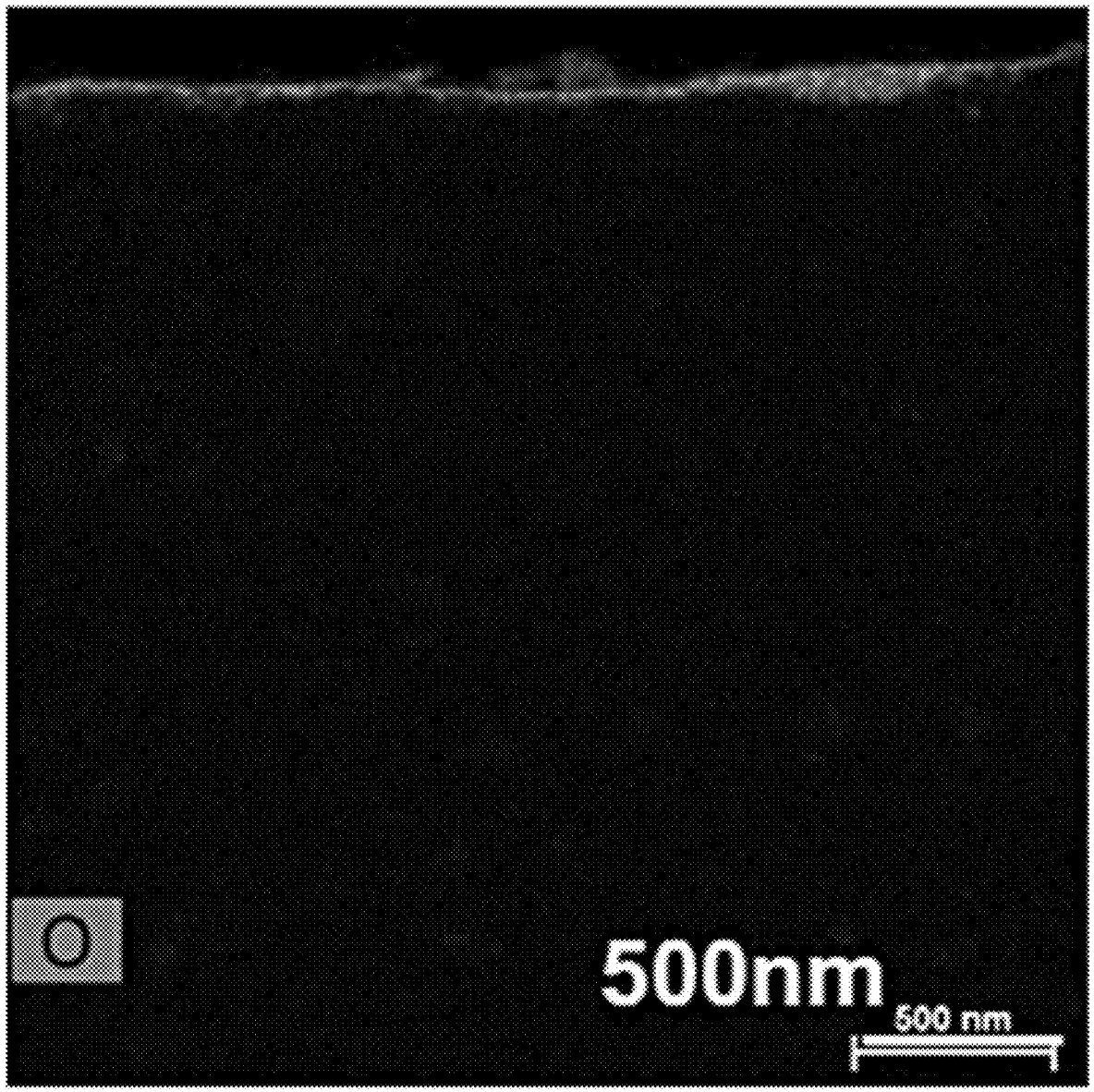
Figure 4A:
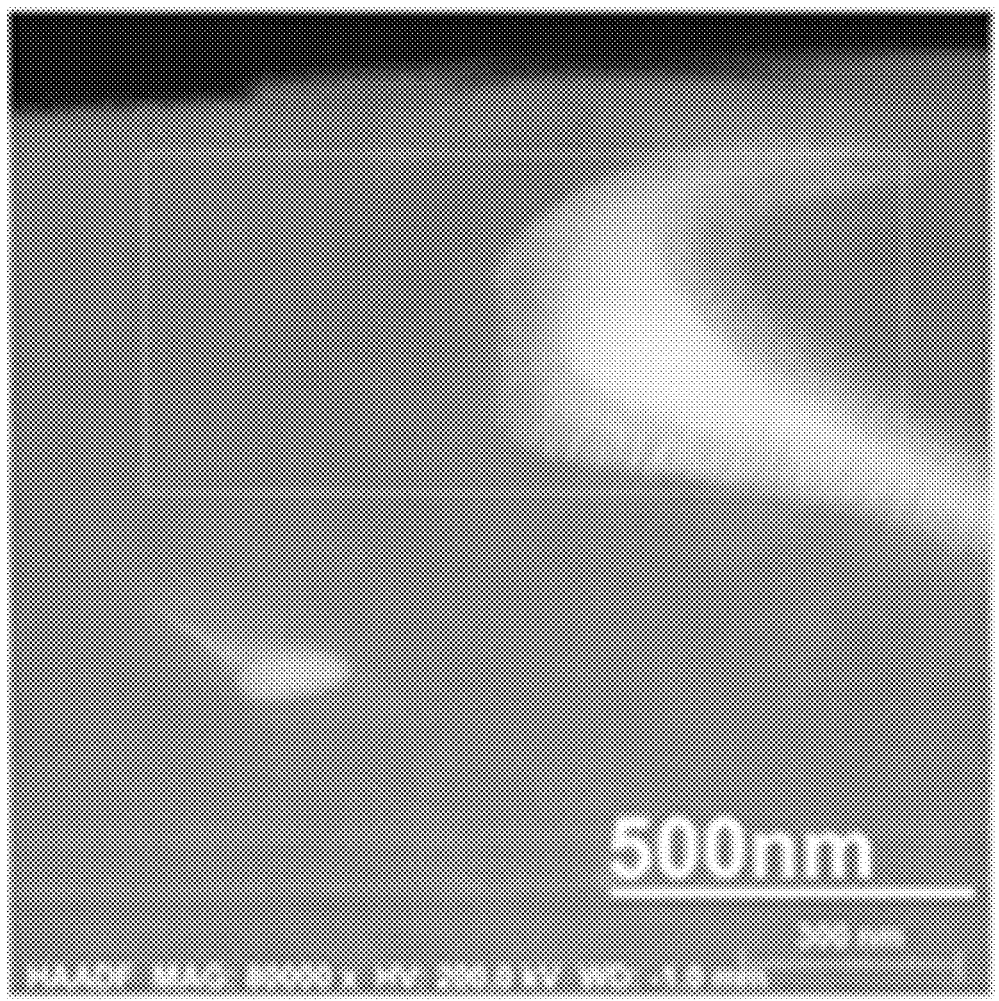
FIGS. 4A-4F show maps for HAADF STEM image (a) for elements Al, Cu, Fe, Mg, Mn, and O for the laser-interference processed Al 2024-T3 specimen with 8 shots per spot (8 shots-per-spot (a1_ag1_p1_8s).
Figure 4B:
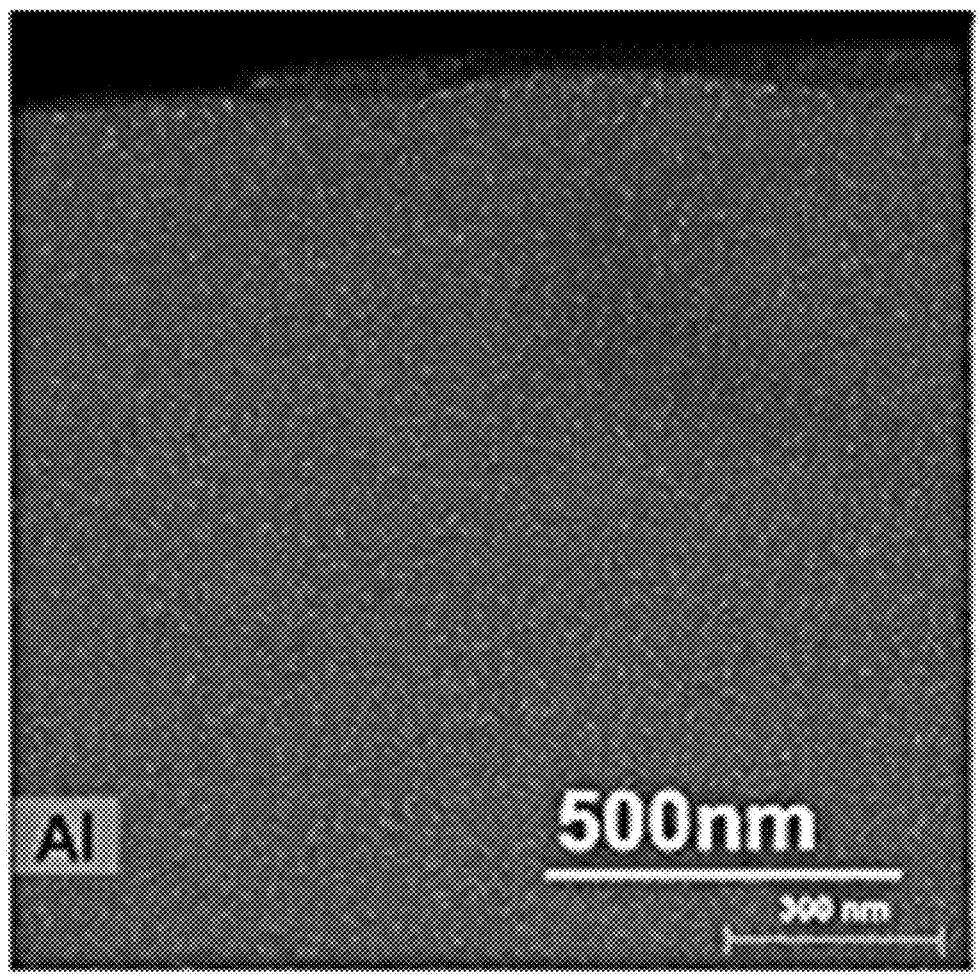
Figure 4C:
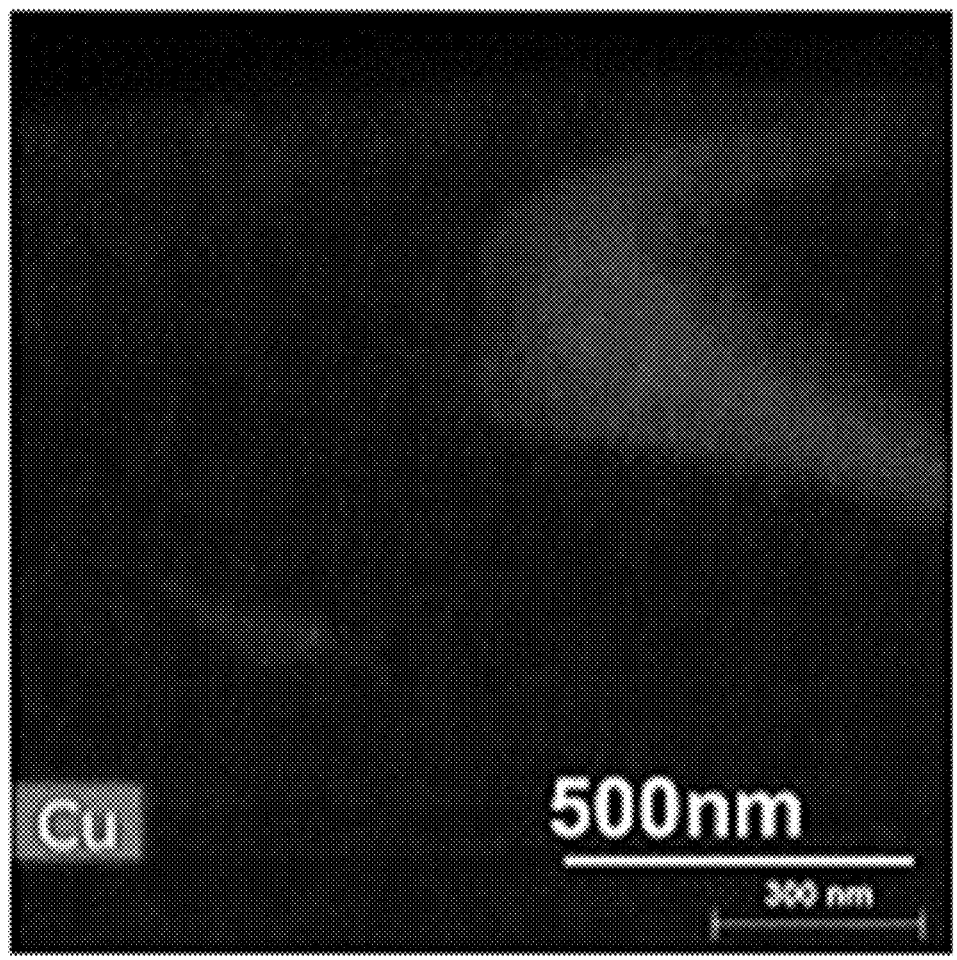
Figure 4D:
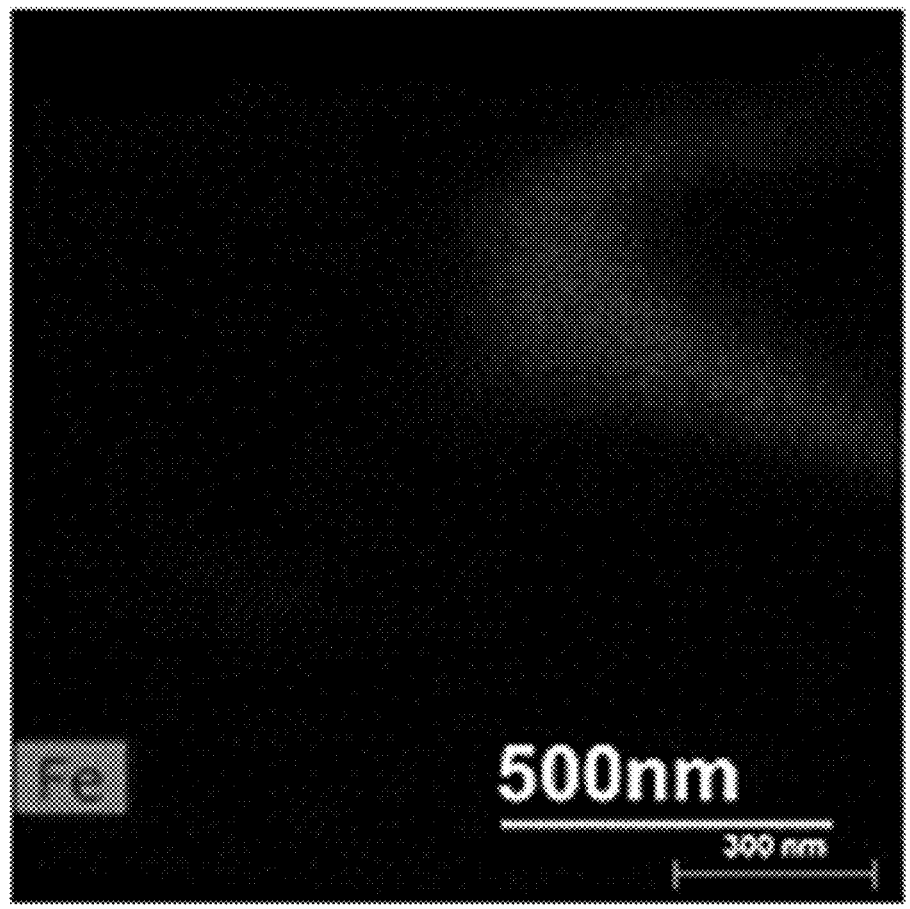
Figure 4E:
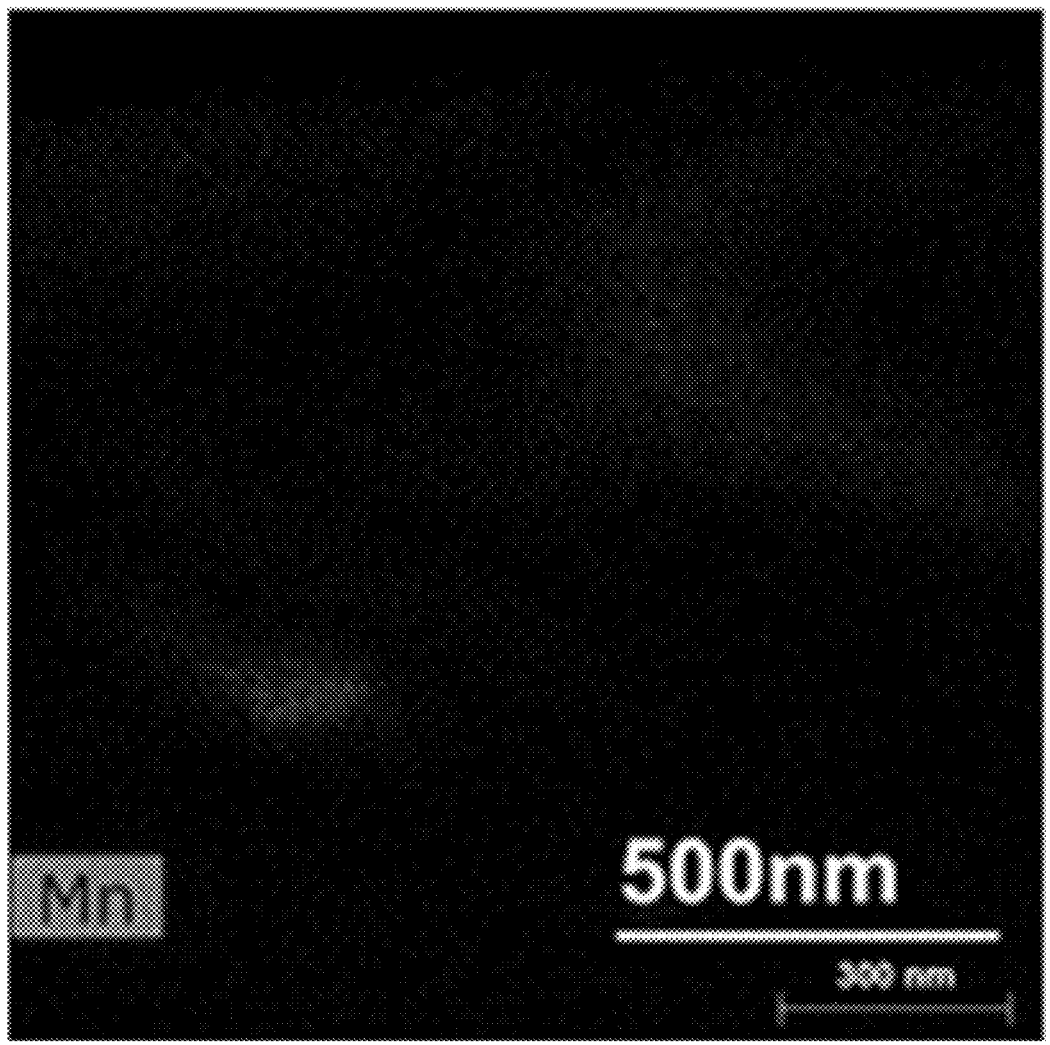
Figure 4F:
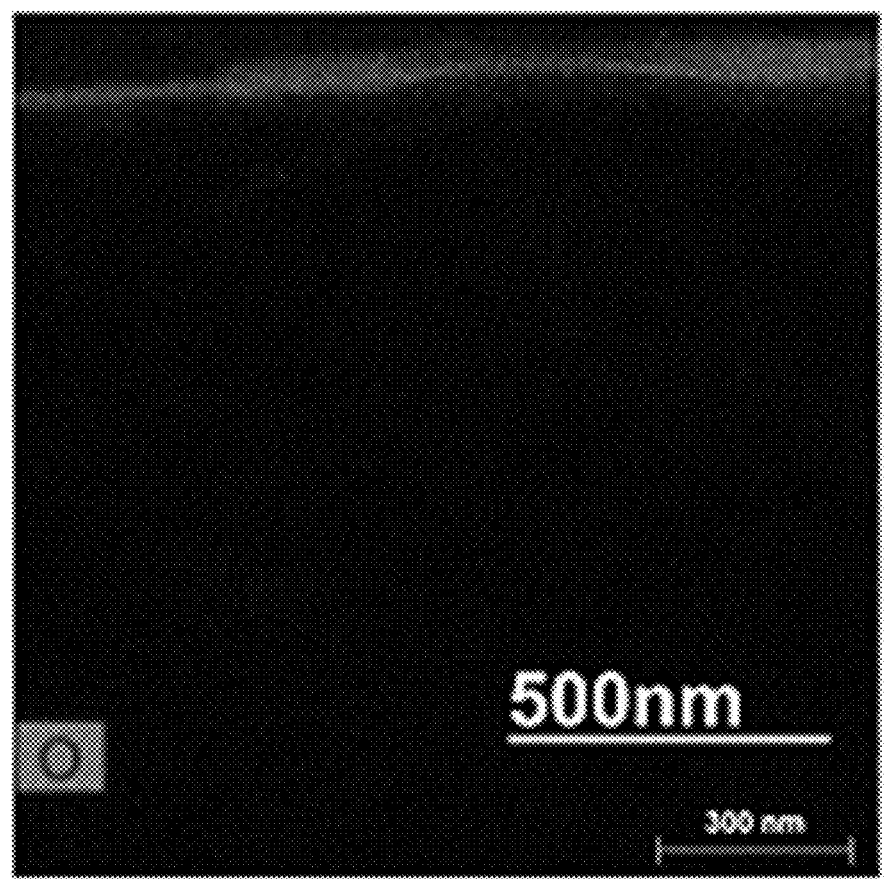

SEM/STEM characterization was performed mainly for vertical cross-sections to investigate the laser-interference effects on the sub-surface microstructure. The HAADF STEM images for as-received and laser-interference processed specimens are shown in FIG. 2. The STEM images reveal the presence of precipitates. The precipitates are uniformly distributed through the thickness of the as-received specimen, without any laser processing (FIG. 2A). For the laser-structured specimens, the STEM images shown in FIGS. 2B and 2C indicate that the laser-interference processing affected the first top layer of 500 nm at the specimen surface. Within that first 500 nm top layer, the $Al_2Cu$ precipitates did not grow for the 2-shot laser specimen and dissolved within the bulk alloy matrix. For the 8-shot specimen, a relatively large microstructure feature can be observed, in an otherwise precipitate free region. In order to identify the nature of the of the elongated and curved feature observed, Energy Dispersive X-ray Spectroscopy (EDS) maps were obtained for that region.

Both x-ray photoelectron spectroscopy (XPS, Thermo Scientific K-Alpha) and electron energy dispersive spectroscopy (EDS) were used to determine the surface, sub-surface, and bulk composition. The energy dispersive X-ray spectrometer (EDS), which was attached to the electron beam column, was used to provide data on surface and subsurface elemental characterization. EDS is performed in both the scanning transmission electron microscope (STEM; FEI Talos) and with a scanning electron microscope (SEM, Hitachi 4800). The x-rays collected for EDS are sorted by energy and provide the overall alloy composition within an analytical volume of approximately 1 cubic micron for bulk samples. EDS measures element-specific x-rays that are emitted when a sample is irradiated with high-energy electrons (typically 10-20 keV) and is well suited for assessing metal alloy composition.

XPS is a surface sensitive technique able to identify all elements of the periodic table, except H and He. XPS is well suited for quantifying light elements typically found on air-exposed engineering surfaces: namely, C, O, and N and common impurities such as Ca, Na, Si and S. In addition to identifying what elements are present, XPS is also capable of identifying their chemical state, i.e. it can distinguish the difference between a metal and an oxide. This is particularly helpful in determining the removal by laser treatment of any initial native oxide or the possible growth of a new or different oxide subsequent to treatment. XPS was used to assess the overall surface composition, paying close attention to the amount of contaminant material that has been removed. In particular, the removal of greases or oils is monitored by noting the changes to the C 1s core level spectrum as compared to the as-received material. Selected samples will also be Ar-ion depth profiled to assess the composition as a function of depth, i.e., subsurface distribution of elements. Depth profiling is performed by alternately measuring a series of core level spectra and then sputter-removing nanometers of material. XPS is performed by shining Al-ka x-rays on to the surface and monitoring element-specific photo-emitted electrons and will identify all elements present on the surface of the alloy. Here, surface is defined as the outermost ~10 nm of material.

Overall surface composition was determined, paying close attention to the amount of contaminant material that has been removed. In particular, the removal of greases or oils was examined by monitoring carefully the changes to the C 1s core level spectrum as compared to the as-received material. Also, close attention was given to the increase or decrease in the amount of surface oxide.

Elemental maps for Al, Cu, Fe, Mg, Mn, and O are shown in FIGS. 3 and 4 for the as-received specimen and the laser-structured specimen, respectively. FIG. 3 shows maps for HAADF STEM image for elements Al, Cu, Fe, Mg, Mn, and O. The data is for the vertical cross-section of an as-received Al 2024-T3 specimen without any laser processing. FIG. 4 shows maps for HAADF STEM image (a) for elements Al, Cu, Fe, Mg, Mn, and O. The data is from the vertical cross-section of a laser-interference processed Al 2024-T3 specimen with 8 shots per spot (8 shots-per-spot (a1_ag1_p1_8s). The elemental maps can be used to identify CuFe-rich precipitates (larger size) and Mn-rich precipitates (smaller in size). The elemental maps for the laser-structured specimen with 8-shot per spot were sized such that the scale marker has the same length as that for the as-received specimen. The elemental maps were obtained for the first 1 micron, trying to image the detail on a large curved feature observed in STEM images (FIG. 2C). The elemental maps show that this feature contains Cu and Fe and that it is not Mn rich as most of the precipitates observed in the as-received specimen. The Cu and Fe content are also smaller than those in the large precipitate evidenced in the EDS maps for the as-received specimen.

Selected samples were Ar-ion depth profiled to assess the composition as a function of depth. Depth profiling is performed by alternately measuring a series of core level spectra and then sputter-removing nanometers of material. Each set of core level spectra can be used to determine composition and when plotted against sputter time create effectively a depth profile. The ion gun settings (energy and current) had previously been calibrated using 100 nm thick $SiO_2$ films to determine a sputter rate of 12 nm/min. All depth profiles reported used the same sputter rate. Knowing the sputter rate and measuring sputter time, a depth scale was determined for the profiles. It should be noted that the actual depth may be different from the scale shown. Comparing the depth profiles for the different samples, however, should be valid.

Figure 5A:
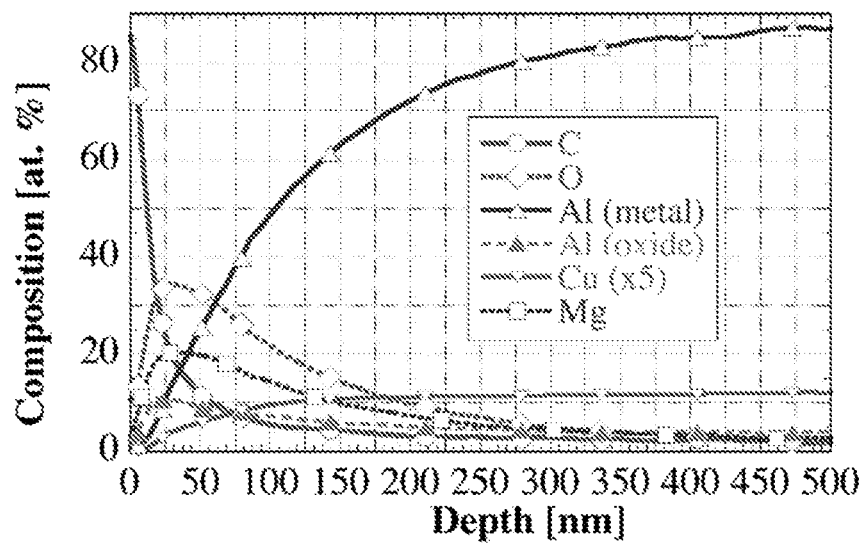
FIGS. 5A-5C show depth profiles of the composition (at. %) Al-2024 baseline material as-received without any laser processing, and in FIG. 5A the entire profile C, O and main alloy elements, in FIG. 5B a detailed profile for the first 160 nm for C, O and main alloy elements, and in FIG. 5C profiles for Mn, Na, and Cl.
Figure 5B:
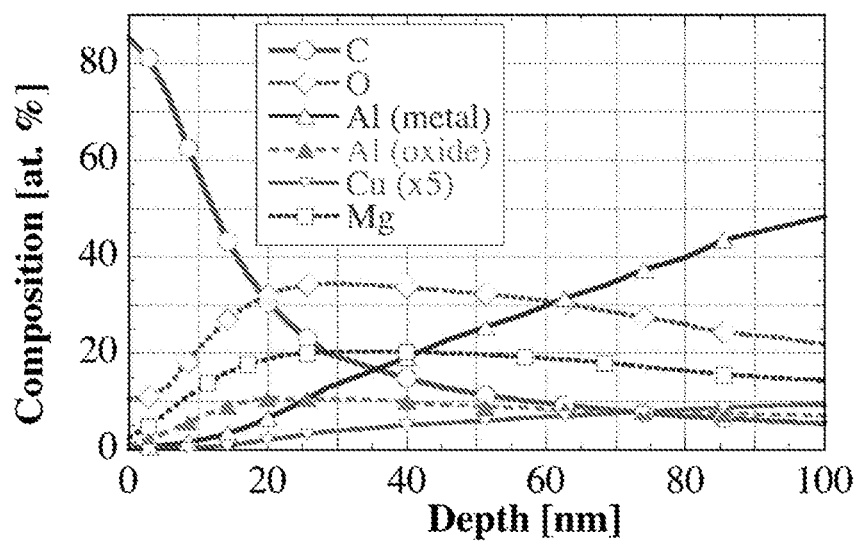
Figure 5C:
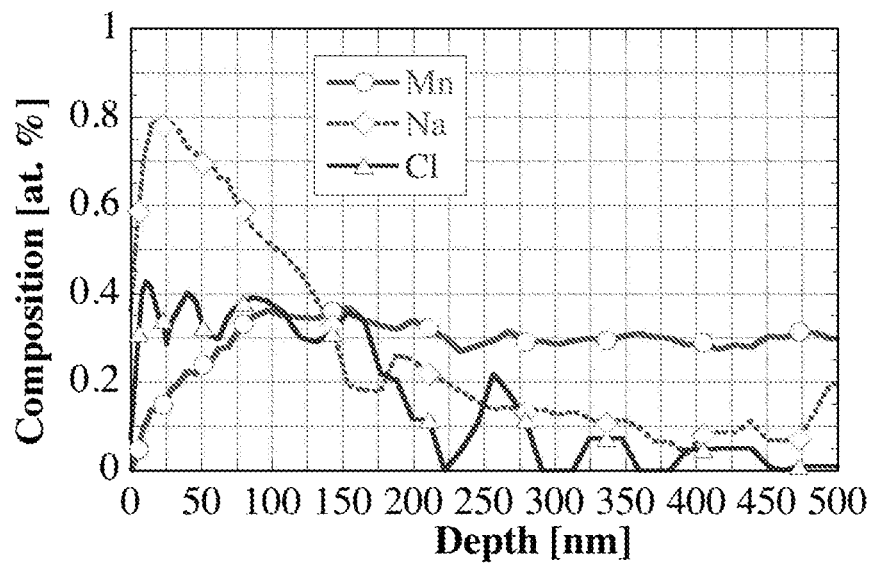

XPS data clearly shows that the thickness of the Al oxide layer is larger than that for the baseline specimen and that the oxide thickness increases with the number of shots per spot. The additional thicker oxide on Al alloys is likely to increase the corrosion resistance of the coated Al 2024. XPS data were acquired first on the as received Al-2024 specimen. FIG. 5A-5C are depth profiles of the composition (at. %) Al-2024 baseline material—as-received specimen (without any laser processing). FIG. 5A shows the entire profile for C, O and main alloy elements. FIG. 5B shows the detailed profile for first 160 nm for C, O and main alloy elements. FIG. 5C shows profiles for Mn, Na, and Cl. FIGS. 5A and 5B show the profiles for C, O, Al, Mg, and Cu (note that the Cu signal is X5, i.e., 5 times factor). The Al 2p data was peak fit to show both the Al-metal and Al-oxide contributions. As sputtering starts, the C signal drops quickly while the Al-oxide, Mg, and O signals increase to depth of ~30 nm. At about this point, the Al-metal and Cu signals begin to increase. Further sputtering continues to reduce the C and begins to reduce the O, Al-oxide and Mg signals. Above 500 nm depth, the Al-oxide and O signals are effectively gone and the Mg signal has decreased to it "bulk" value. FIG. 5C shows the weaker Na, Cl, and Mn signals. After initially rising to maximum values at ~20-25 nm, the Na and Cl signals are removed with continued sputtering and are effectively eliminated by a depth of ~300 nm.

Figure 6A:
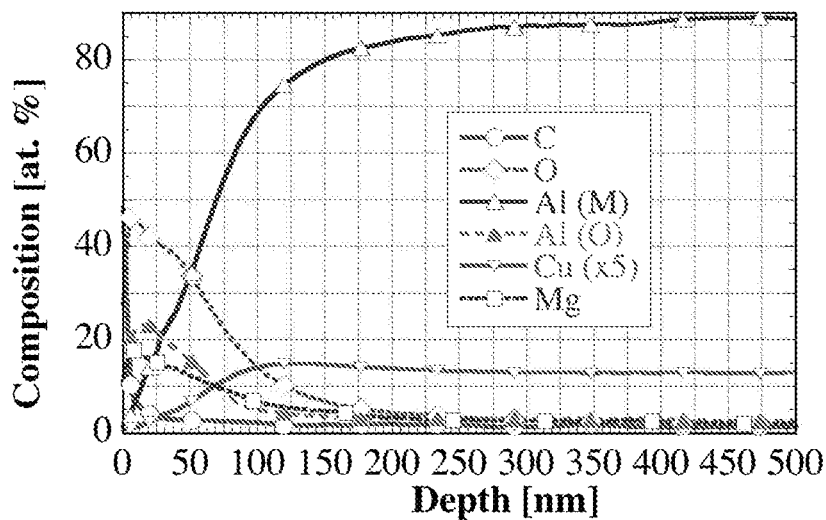
FIGS. 6A-6C show depth profiles of the composition (at. %) for the laser-interference processed specimen with 2 shots-per-spot (a1_ag1_p1_2s), and in FIG. 6A the entire profile C, O and main alloy elements, in FIG. 6B the detailed profile for the first 160 nm for C, O and main alloy elements, and in FIG. 6C profiles for Mn, Na, and Cl.
Figure 6B:
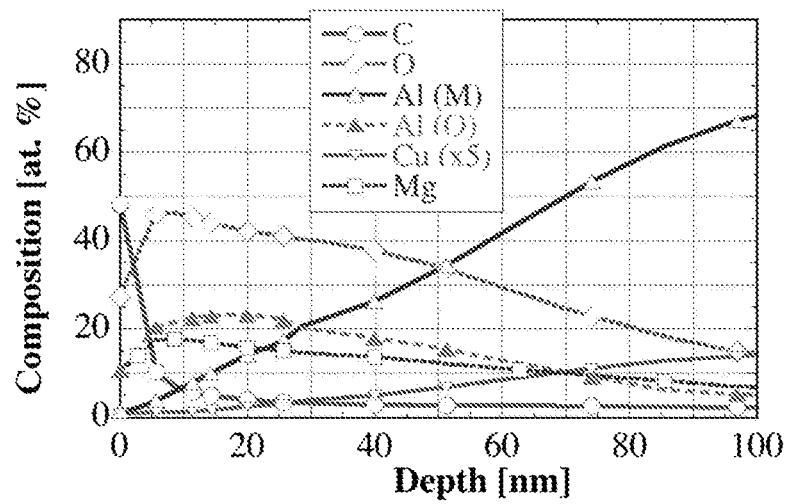
Figure 6C:
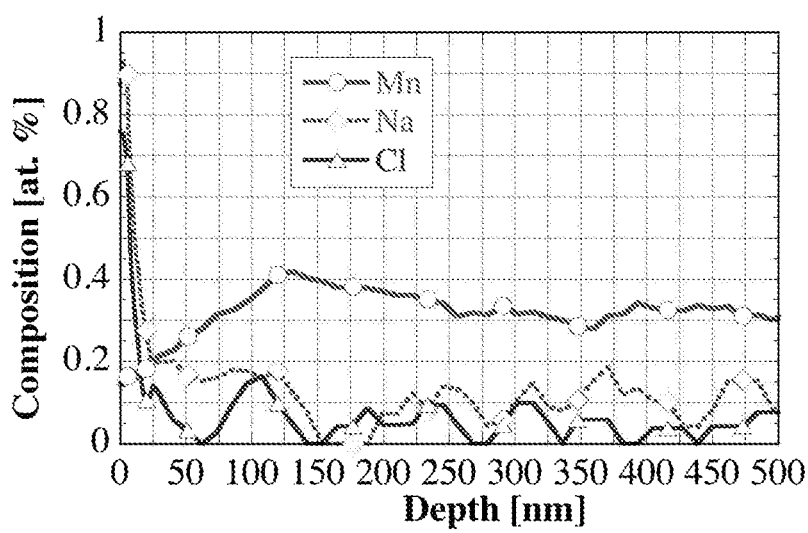

For the 2-shot laser processed specimen, four different analysis points were selected: two were near the edges of shot areas and two were in the centers of shot areas. FIG. 6 shows the depth profile data for the 2-shot laser-interference processed specimen (i.e., a1_ag1_p1_2s). FIGS. 6A-6C are depth profiles of the composition (at. %) for the laser-interference processed specimen with 2 shots-per-spot (a1_ag1_p1_2s) for: FIG. 6A—the entire profile C, O and main alloy elements; FIG. 6B—the detailed profile for the first 160 nm for C, O and main alloy elements; and FIG. 6C—profiles for Mn, Na, and Cl. FIGS. 6A and 6B show the profiles for C, O, Al, Mg, and Cu (Cu signal is again ×5). The Al 2p data was peak fit to show both the Al-metal and Al-oxide contributions. As sputtering starts, the C signal drops quickly while the Al-oxide, Mg, and O signals increase.

The Mg and the O signal intensities peak at a depth of ~10 nm while the Al-oxide hits its maximum at ~20 nm. Further sputtering continues to reduce the C and begins to reduce the O, Al-oxide and Mg signals. Above 200 nm depth, the Al-oxide and O signals are effectively gone and the Mg signal has decreased to it "bulk" value. The Al-metal and Cu signals begin to increase with early sputtering and continue to rise till their plateau values (i.e. "bulk" values) are reached at ~100 nm depth. The lower panel shows the weaker Na, Cl, and Mn signals. After initially rising to maximum values at ~2-3 nm depth, the Na and Cl signals are removed with continued sputtering and are effectively removed by a depth of ~50 nm. This XPS depth profile data shows clearly that 2-shot processing has removed some of the C-rich outer layer and has slightly increased the oxide layer on the alloy surface. The in-lens SEM images also show after laser processing the surface is void of any contaminants, which appear as black spots on the as-received surface without any laser processing.

Figure 7A:
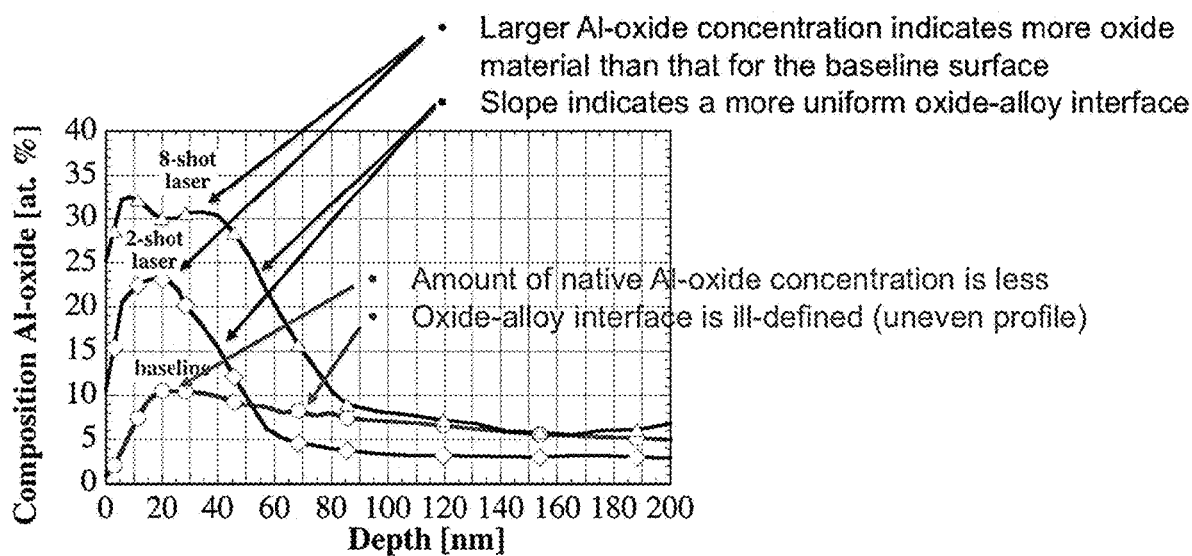
FIG. 7A shows depth profiles of the Al-oxide (at. %) for laser-interference processed specimen with 2 and 8 shots-per-spot (a1_ag1_p1_2s and a1_ag1_p1_2s, respectively).
Figure 7B:
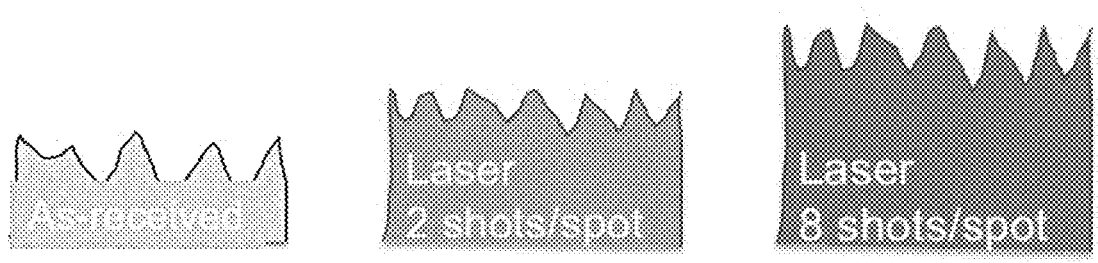
FIG. 7B illustrates the relative oxide thickness and its variation for the three types of specimens investigated in FIG. 7A.

FIG. 7A shows the depth profiles of the Al-oxide is shown for the Baseline, 2-Shot and 8-Shot specimens. From the data shown in FIG. 7A the thickness of the Al-oxide can be obtained for the Baseline, 2-Shot and 8-Shot specimens. The data clearly shows that the thickness of the Al oxide layer is larger than that for the baseline specimen and that the oxide thickness increases with the number of shots per spot, as shown schematically in FIG. 7B.

Contact angle measurements were performed to demonstrate that laser-structured specimens were comparable with chemical conversion coatings, and that the laser structured specimens would exhibit similar wetting behavior and surface energies as the chemical conversion coating surface treatment, being ready for further coating application. Contact angle measurements were conducted at selected laser spots using a standard goniometer (Rame-hart, 260-F4, with software DROPimage Advanced version 2.5.02). Table 2 summarizes the surface tension of the four liquids used for contact angle measurement. Volume of the liquids is controlled at 3 µL for contact angle measurement. The surface tension of the liquids was characterized by bubble pressure tensiometry technique to determine the total surface tension. Then, the dispersive and polar components were determined by their contact angle on a polytetrafluoroethylene (PTFE) plate.

TABLE 2

| Liquids | Total Surface Tension mN/m | Dispersive component mN/m | Polar component mN/m |
|---|---|---|---|
| Diiodomethane | 42.7 | 42.7 | 0.0 |
| Ethylene Glycol | 48.3 | 28.1 | 20.3 |
| 2,2'Thiodethanol | 54.0 | 39.2 | 14.8 |
| De-ionic water | 71.9 | 19.5 | 52.4 |

Before measurement, the goniometer is properly calibrated, and tilt of sample holder baseline was adjusted to zero. A drop of liquid with precise controlled volume was formed in the tip of pipette, and then the pipette was slowly moved down until the liquid droplet touches the spot of interest. Then, the pipette was slowly raised to leave the liquid droplet on the surface. The inertia effect on the final liquid drop on the surface can be avoided according to this procedure. Finally, the contact angle was measured on each side of the drop contacting the surface by DROPimage Advanced using profile method. The average value of the contact angle on the left and right side is used for future surface energy characterization. The tests are repeated 5 times on different spots of the same alloy.

The results for the average contact angle measurements and standard deviation for three materials is shown in Table 3. Table 3 includes A1-6 and A1-8 (laser structured with 6 and 8 shots per spot, laser beam angle of 12°, laser power 3.5 W, and beam spot size at the specimen surface of 6 mm) and chemical conversion coating (CCC).

TABLE 3

| | Laser A1-6 | | Laser A1-8 | | CCC | |
|---|---|---|---|---|---|---|
| Liquids | Mean (°) | Std. Dev. (°) | Mean (°) | Std. Dev. (°) | Mean (°) | Std. Dev. (°) |
| Diiodomethane | 48.84 | 2.31 | 43.58 | 1.40 | 54.96 | 0.75 |
| Ethylene Glycol | 73.56 | 0.74 | 72.36 | 0.52 | 53.90 | 1.46 |
| Thiodethanol | 68.60 | 1.22 | 67.14 | 0.44 | 67.86 | 1.04 |
| Water | 96.92 | 1.17 | 97.16 | 1.83 | 90.10 | 2.50 |

For the coating experiments, the specimens were laser-interference processed by varying the number of shots per spot from 6 to 8. In total 8 specimens were prepared, 4 specimens per each condition in order to be used with each of the liquids considered for contact angle measurements. One baseline specimen was considered, the chemical conversion coating (CCC) prepared according to MIL-DTL-5541 type I with Cr(VI), having a gold and/or brown color.

Primers meetings these military specs were manufactured by PPG Aerospace PRC-DeSoto, 12780 San Fernando Road, Sylmar, Calif. 91342. Table 4 shows the composition of Desoprime™ HS CA7233 Military Epoxy Primer (Mix ratio by volume 1 part of CA 7233A BASE and 1 part of CA 7233B ACTIVATOR).

TABLE 4

| | % | CAS number |
|---|---|---|
| Ingredient name for CA 7233A BASE | | |
| strontium chromate | ≥20-≤50 | 7789-06-2 |
| crystalline silica, respirable powder (<10 microns) | ≥20-≤50 | 14808-60-7 |
| butan-1-ol | ≥20-≤29 | 71-36-3 |
| proprietary polyaminoamide | ≥5.0-≤10 | Not available. |
| titanium dioxide | ≥1.0-≤5.0 | 13463-67-7 |
| benzyl alcohol | ≥1.0-≤4.5 | 100-51-6 |
| xylene | ≥1.0-≤4.0 | 1330-20-7 |
| m-phenylenebis(methylamine) | ≤2.0 | 1477-55-0 |
| ethylbenzene | <1.0 | 100-41-4 |
| Ingredient name for CA 7233B ACTIVATOR | | |
| 4-chloro-α,α,α-trifluorotoluene | ≥50-≤75 | 98-56-6 |
| reaction product: bisphenol-A-(epichlorhydrin); epoxy resin | ≥20-≤50 | 25068-38-6 |
| xylene | ≥5.0-≤10 | 1330-20-7 |
| Epoxy resin (MW ≤700) | ≥1.0-≤5.0 | 25068-38-6 |
| 2,2-bis(acryloyloxymethyl)butyl acrylate | ≥1.0-≤5.0 | 15625-89-5 |
| ethylbenzene | ≥0.10-≤2.9 | 100-41-4 |

Table 5 shows the composition of DE44GN098XMPG32K compatible for MIL-PRF-85582, Type I, Class N. Mix ratio by volume of 44GN098 (base component), 44GN098CAT (catalyst component) and Reducer (Distilled or Deionized water) is 2 parts, 1 part and 4 parts, respectively, by volume.

TABLE 5

| | % | CAS number |
|---|---|---|
| Ingredient name for 44GN098 (base component) | | |
| Gypsum | ≥20-≤50 | 13397-24-5 |
| Proprietary Polyamide | ≥20-≤50 | Proprietary |
| butan-2-ol | ≥10-≤20 | 78-92-2 |
| titanium dioxide | ≥10-≤20 | 13463-67-7 |

TABLE 5-continued

| | % | CAS number |
|---|---|---|
| dipraseodymium trioxide | ≥10-≤20 | 12036-32-7 |
| crystalline silica, respirable powder (>10 microns) | ≥1.0-≤5.0 | 14808-60-7 |
| Ingredient name for 44GN098CAT (catalyst component) | | |
| reaction product: bisphenol-A-(epichlorhydrin); epoxy resin | ≥50-≤75 | 25068-38-6 |
| nitroethane | ≥20-≤34 | 79-24-3 |

The CAS Registry Number, also referred to as CASRN or CAS Number, is a unique numerical identifier assigned by the Chemical Abstracts Service ("CAS", Columbus, Ohio) of the American Chemical Society to every chemical substance described in the open scientific literature, currently including all substances described from 1957 through the present, plus some substances from the early or mid 1900s.

Samples were prepared following a procedure for X-cut tape adhesion tests according to section 7 of ASTM D3359 An x-cut is made through the film to the substrate, pressure-sensitive tape is applied over the cut and then removed, and adhesion is assessed qualitatively on the 0 to 5 scale, as follows:
1. Make two cuts in the film each about 40 mm (1.5 in.) long that intersect near their middle with a smaller angle of between 30 and 45°. When making the incisions, use the straightedge and cut through the coating to the substrate in one steady motion.
2. Inspect the incisions for reflection of light from the metal substrate to establish that the coating film has been penetrated.
3. Place the center of the tape at the intersection of the cuts with the tape running in the same direction as the smaller angles. Smooth the tape into place by finger in the area of the incisions and then rub firmly with the eraser on the end of a pencil.
4. Within 60 to 120 s of tape application, remove the tape by seizing the free end and pulling it off rapidly back upon itself at as close to an angle of 180° as possible.

The coating adhesion was evaluated using by examining the X-cut coating area, which was removed from the substrate or previous coating, was rated for the adhesion in accordance with established scale classifications. Table 6 shows classifications for X-cut coating adhesion test results (section 7.7 of ASTM D3359).

TABLE 6

| Scale | Inspection criteria |
|---|---|
| 5A | No peeling or removal |
| 4A | Trace peeling or removal along incisions or at their intersection |
| 3A | Jagged removal along incisions up to 1.6 mm (1/16 in.) on either side |
| 2A | Jagged removal along most of incisions up to 3.2 mm (1/8 in.) on either side |
| 1A | Removal from most of the area of the X under the tape |
| 0A | Removal beyond the area of the X |

Samples were also prepared following a procedure for cross-hatch coating adhesion tests according to section 12 of ASTM D3359. The steps include:
1. For coatings having a dry film thickness up to and including 2.0 mils (50 µm) space the cuts 1 mm apart and make eleven cuts unless otherwise agreed upon. A Paint Adhesion Test (PAT) kit was purchased from Gardco, Co., including the PA-2000 handle and the cutter PA-2053 (1.0 mm BLADE spacing with 11 teeth). https://www.gardco-.com/pages/adhesion/PATkit.cfm
2. Make all cuts about 20 mm (¾ in.) long. Cut through the film to the substrate in one steady motion using just sufficient pressure on the cutting tool to have the cutting edge reach the substrate.
3. After making the required cuts brush the film lightly with a soft brush or tissue to remove any detached flakes or ribbons of coatings.
4. Brush the area as before and inspect the incisions for reflection of light from the substrate. If the metal has not been reached make another grid in a different location.
5. Place the center of the tape over the grid and in the area of the grid smooth into place by a finger. To ensure good contact with the film rub the tape firmly with the eraser on the end of a pencil.
6. Within 60 to 120 s of tape application, remove the tape by seizing the free end and pulling it off rapidly back upon itself at as close to an angle of 180° as possible.

The coating adhesion was evaluated using by examining the grid area for removal of coating from the substrate or from a previous coating using a magnifier and rating the adhesion for according to established scale classifications. Table 7 shows classifications for cross-hatch coating adhesion test results (section 12.9 of ASTM D3359).

TABLE 7

| Scale | Examination of grid area for coating removal | Area affected of the lattice [%] |
|---|---|---|
| 5B | The edges of the cuts are completely smooth; none of the squares of the lattice is detached. | 0 |
| 4B | Small flakes of the coating are detached at intersections. | Less than 5 |
| 3B | Small flakes of the coating are detached along edges and at intersections of cuts. | Between 5 to 15 |
| 2B | The coating has flaked along the edges and on parts of the squares. | Between 15 to 35 |
| 1B | The coating has flaked along the edges of cuts in large ribbons and whole squares have detached. | Between 35 to 65 |
| 0B | Flaking and detachment worse than Grade 1. | Larger than 65 |

The coating adhesion was evaluated for specimens that were spray coated with either "23377" (MIL-PRF-23377, Type I, Class C2) or "85582" (MIL-PRF-85582, Type I, Class N). After surface preparation, the following procedure was followed to conduct coating adhesion testing:
1. Spray coat either "23377" or "85582"
2. Cure coating with a) accelerated cure (total time 48 h): 24 h ambient+24 h at 140° F.; or b) full cure (total time 14 days): 14 days at ambient
3. Measure coating thickness after curing.
4. Conduct X-cut tape adhesion tests, and/or
5. Conduct cross-hatch adhesion tests.

Both the laser-structure specimens and the controlled specimens were stored either in plastic cases or plastic bags in order to avoid air contaminants and humidity effects for several days, weeks, and even months prior to coating application. The coating thickness was measured after the 48 h accelerated test cure at five locations on each panel (top-left, top-right, center, bottom-left, and bottom-right). The average coating thickness was calculated for each panel based on these five measurements.

The coating adhesion was evaluated using the X-cut test and cross-hatch test. For the X-cut test, the coating adhesion was evaluated using by examining the X-cut coating area, which was removed from the substrate or previous coating, was rated for the adhesion in accordance with the scale classification shown in Table 6. For the cross-hatch test, the coating adhesion was evaluated using by examining the grid area for removal of coating from the substrate or from a previous coating using a magnifier and rating the adhesion for according with the scale classification shown in Table 7.

The X-cut data shows that the thin-coated (within the MIL-PRF-23377 specs) laser-interference structured (LIS) specimens exhibited very good coating adhesion, while the thick coatings on LIS surfaces exhibited moderate coating adhesion.

Consistent with the X-cut tests, the coating adhesion as evaluated from the cross-hatch tests of 23377 coatings is better for the thin coated specimens, which are in fact within the MIL-PRF-23377 specs, than for the thick LIS coated specimens. The coating adhesion of thin-coated specimens is very good, with some specimens having the highest coating adhesion ranking.

The cross-hatch for thin 23377 coated laser-interference structured specimens outperforms that of the controlled specimens, which were prepared with chemical conversion coating (CCC).

Unlike for the 23377 coating, the cross-hatch for the 85582 coating indicate are slightly lower coating adhesion ranking for thinner coating specimens than for the thicker coating specimens. While the coating adhesion for the thicker coating specimens is very good for both the baseline (control specimens) and laser-interference structured specimens, the coating adhesion for the thinner coating specimens is better for the laser-interference structured specimens, but lower than that for the LIS thick coating specimens.

Figure 8:
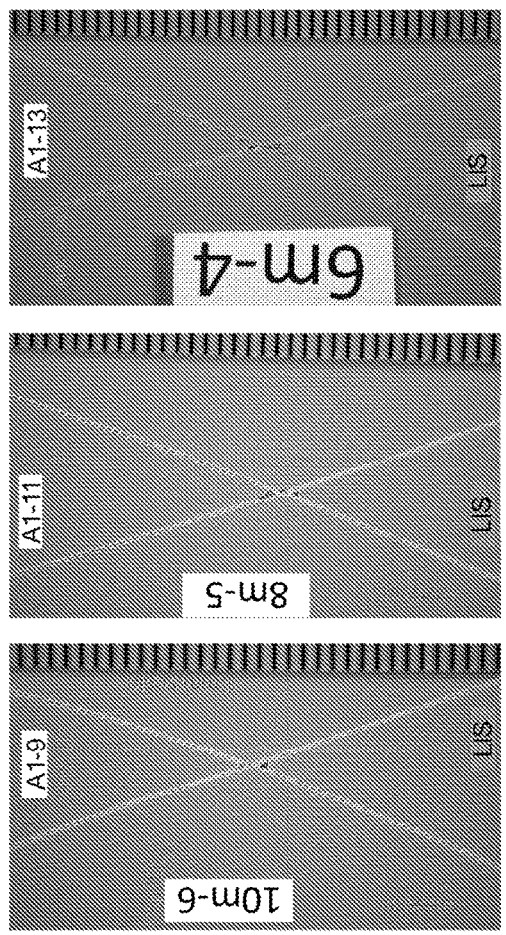
FIG. 8 shows pictures of coated laser-interference structured panels after X-cut tests for thick coating specimens A1-9, A1-11, and A1-13.
Figure 9:
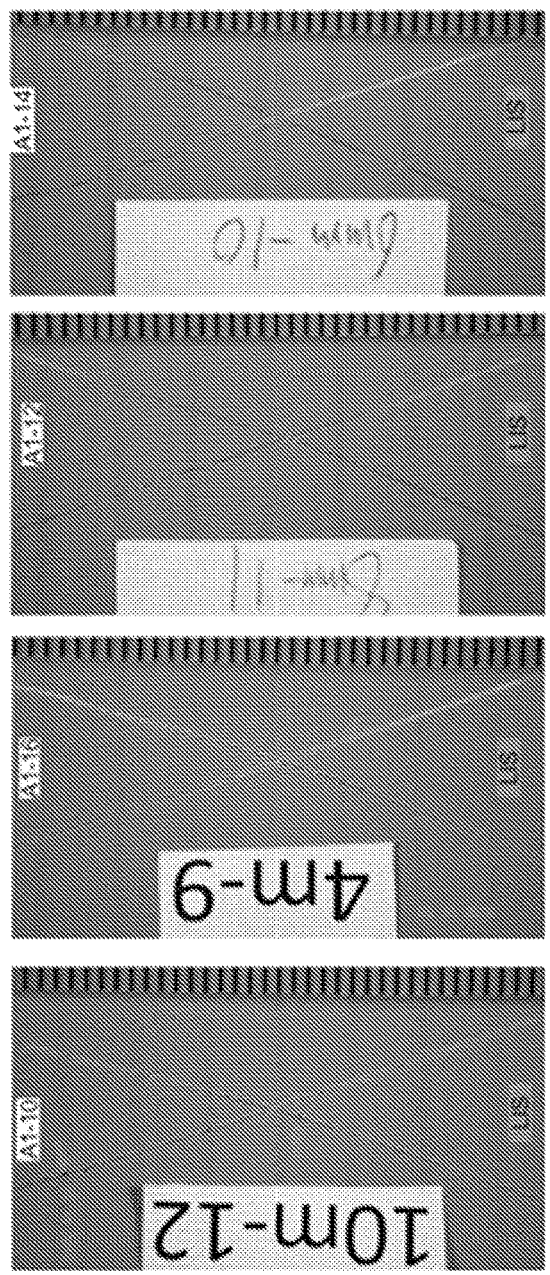
FIG. 9 shows pictures of coated laser-interference structured panels after X-cut tests for thin coating specimens A1-10, A1-16, and A1-12, and A1-14.

Pictures of laser-interference structured (LIS) panels after X-cut tests coating adhesion testing are shown in FIGS. 8 and 9 for the 23377 coating. Pictures of panels after X-cut tests for thick coating specimens A1-9, A1-11, and A1-13 are shown in FIG. 8 while those for thin-coated specimens A1-10, A1-16, and A1-12, and A1-14 are shown in FIG. 9. The results for thick coatings, which are approximately 40 to 44 micron thick and are almost as twice as large from desired coating thickness, are considered only as a further evidence of coating adhesion exhibited by the laser-structured specimens. The evaluation of test scale is indicated together with coating type (23377) and average coating thickness. The data shows that the thin-coated (within the MIL-PRF-23377 specs) laser-structured specimens exhibited very good coating adhesion, while the thick coatings exhibited moderate coating adhesion.

Figure 10:
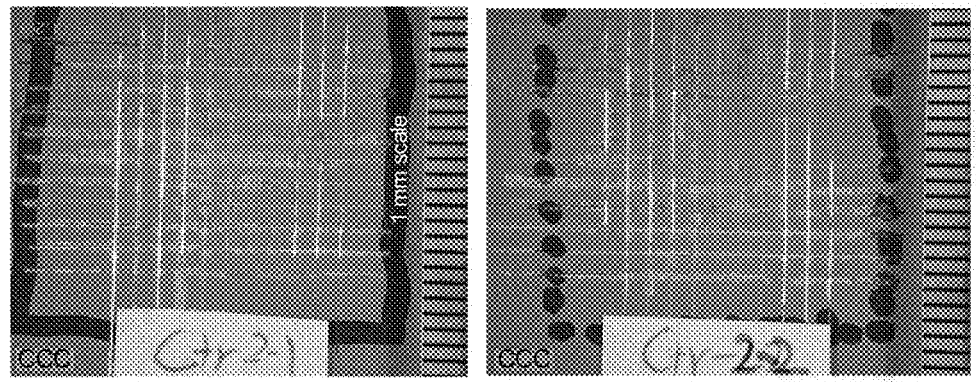
FIG. 10 shows pictures of panels after cross-hatch tests for unstructured control specimens.
Figure 11:
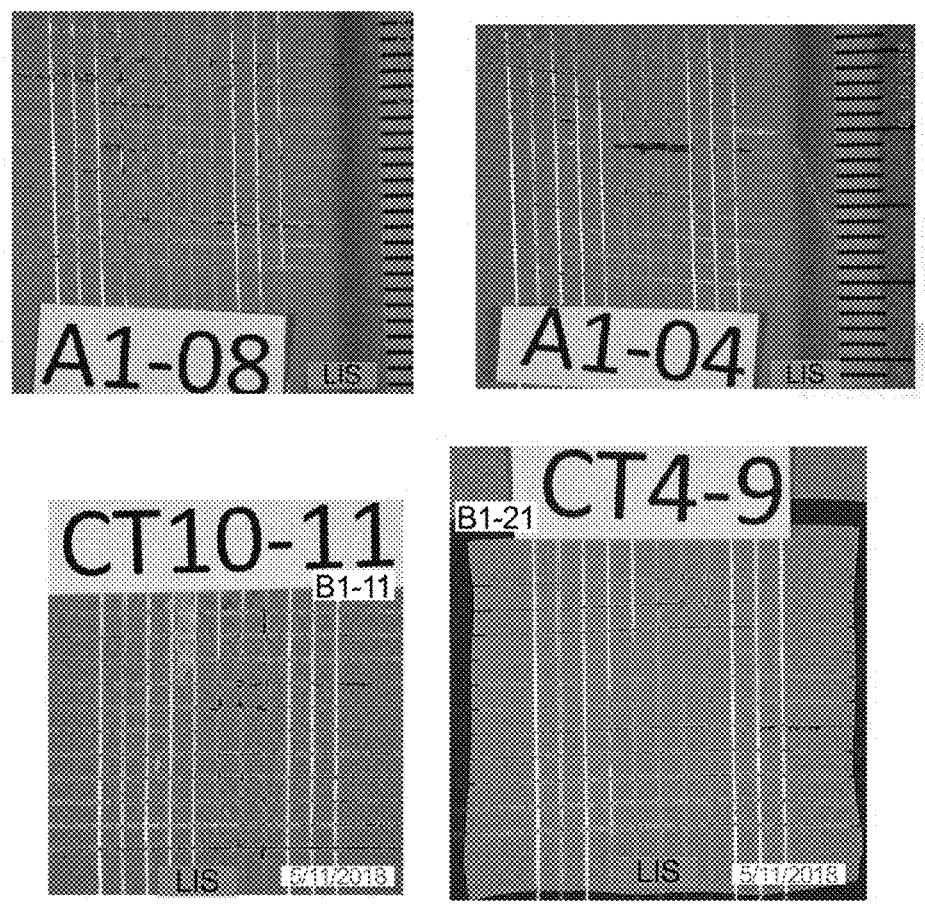
FIG. 11 shows pictures of coated laser-interference structured panels after cross-hatch tests for thick coating specimens A1-08, A1-04, B1-11, and B1-21.
Figure 12:
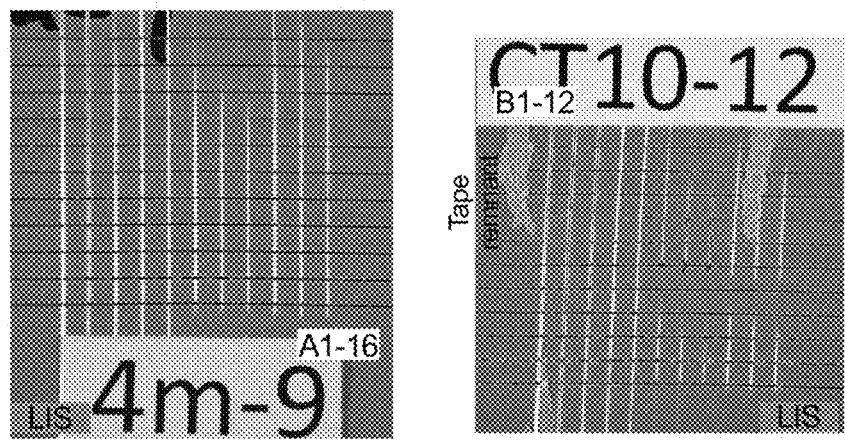
FIG. 12 shows pictures of coated laser-interference structured panels after cross-hatch tests for thin coating specimens A1-16 and B1-12.

Pictures of cross-hatch adhesion testing of controlled specimens, which were prepared with chemical conversion coating (CCC) according to MIL-DTL-5541 type I (with hexavalent Cr) are shown in FIG. 10. Pictures of laser-structured panels after cross-hatch tests coating adhesion testing are shown in FIGS. 11 and 12 for the 23377 coating. Pictures of panels after cross-hatch tests for thick coating specimens A1-08, A1-04, B1-11, and B1-21 are shown in FIG. 11 and those for thin-coated specimens A1-16 and B1-12 are shown in FIG. 12. Consistent with the X-cut tests, the coating adhesion as evaluated from these cross-hatch tests is better for the thin coated specimens, which are within the MIL-PRF-23377 specifications, than for the thick coated specimens. The coating adhesion of thin-coated specimens is very good, with some specimens having the highest coating adhesion ranking. Moreover, the cross-hatch for thin coated specimens outperforms that of the controlled specimens, which were prepared with chemical conversion coating (CCC).

All the details for the specimens tested, including laser-interference conditions and the results for coating adhesion testing for the three batches of 23377 spray coatings on laser-structured panels are summarized in Tables 8, 9 and 10. The results coating adhesion testing of controlled specimens, which were prepared with chemical conversion coating (CCC) according to MIL-DTL-5541 type I (with hexavalent Cr) are shown in Table 11.

Table 8 shows the first batch of 23377 spray coating on 3×3 in² Al panels (paint conditions: humidity 31%, Temp. 22° C., spray gun pressure 25 psi) and results of coating adhesion tests.

TABLE 8

| ID | Laser speed [mm/s] | LIS date | Coating date | Thickness Ave. coating [um] | X-cut date | Cross-hatch date | X-cut scale | Cross-hatch scale |
|---|---|---|---|---|---|---|---|---|
| A1-01 | 10 | Mar. 21, 2018 | Mar. 28, 2018 | 40.1 | — | — | — | — |
| A1-02 | 10 | Mar. 21, 2018 | Mar. 28, 2018 | 41.4 | — | May 11, 2018 | — | * |
| A1-03 | 8 | Mar. 21, 2018 | Mar. 28, 2018 | 40.1 | — | May 11, 2018 | — | * |
| A1-04 | 8 | Mar. 21, 2018 | Mar. 28, 2018 | 44 | — | May 16, 2018 | — | 3B |
| A1-05 | 6 | Mar. 21, 2018 | Mar. 28, 2018 | 44 | — | — | — | — |
| A1-06 | 6 | Mar. 21, 2018 | Mar. 28, 2018 | 40.4 | — | May 11, 2018 | — | * |
| A1-07 | 4 | Mar. 21, 2018 | Mar. 28, 2018 | 40.1 | — | — | — | — |
| A1-08 | 4 | Mar. 21, 2018 | Mar. 28, 2018 | 44 | — | May 16, 2018 | — | 3B |

* practice coupons; thick coating was not fully penetrated by the cutter teeth

Table 9 shows the second batch of 23377 spray coating on 3×3 in² and 2×2 in² Al panels (paint conditions: humidity 62%, Temp. 21 C, spray gun pressure 20 psi) and results of coating adhesion tests.

TABLE 9

| ID | Laser speed [mm/s] | LIS date | Coating date | Thickness Ave. coating [um] | X-cut date | Cross-hatch date | X-cut scale | Cross-hatch scale |
|---|---|---|---|---|---|---|---|---|
| A1-9 | 10 | Mar. 21, 2018 | May 9, 2018 | 44.1 | May 15, 2018 | May 11, 2018 | 3A | 3B |
| AI-11 | 8 | Mar. 21, 2018 | May 9, 2018 | 41.4 | May 15, 2018 | May 11, 2018 | 3A | * |
| A1-13 | 6 | Mar. 21, 2018 | May 9, 2018 | 43.7 | May 15, 2018 | May 11, 2018 | 3A | * |
| A1-15 | 4 | Mar. 21, 2018 | May 9, 2018 | 40.7 | — | — | — | 5B |
| B1-11 | 10 | Apr. 13, 2018 | May 9, 2018 | 42.9 | — | May 11, 2018 | — | 4B |
| B1-21 | 4 | Apr. 13, 2018 | May 9, 2018 | 44.1 | — | May 11, 2018 | — | 4B |

* practice coupons; thick coating was not fully penetrated by the cutter teeth

Table 10 shows the third batch of 23377 coating on 3×3 in² and 2×2 in² Al panels (paint conditions: humidity 62%, Temp. 21 C, spray gun pressure 20 psi).

TABLE 10

| ID | Laser speed [mm/s] | LIS date | Coating date | Thickness Ave. coating [um] | X-cut date | Cross-hatch date | X-cut scale | Cross-hatch scale |
|---|---|---|---|---|---|---|---|---|
| A1-12 | 8 | Mar. 21, 2018 | May 9, 2018 | 20 | May 15, 2018 | May 16, 2018 | 5A | 4B |
| A1-14 | 6 | Mar. 21, 2018 | May 9, 2018 | 19.7 | May 15, 2018 | May 16, 2018 | 5A | 4B |
| A1-16 | 4 | Mar. 21, 2018 | May 9, 2018 | 20.7 | May 15, 2018 | May 11, 2018 | 4A/5A | 5B |
| B1-12 | 10 | Apr. 13, 2018 | May 9, 2018 | 23.5 | — | May 11, 2018 | — | 4B |
| B1-22 | 4 | Apr. 13, 2018 | May 9, 2018 | 21.6 | — | May 11, 2018 | — | * |

* practice coupon

Table 11 shows the first batch of 23377 controlled specimens coated on 4×6 in Al panels at M & P Solutions facilities.

TABLE 11

| ID | CCC date | Coating date | Thickness Ave. coating [um] | X-cut date | Cross-hatch date | X-cut scale | Cross-hatch scale |
|---|---|---|---|---|---|---|---|
| Ctr2-1 | 9-10/17 | Nov. 7, 2017 | 32.5 | — | May 21, 2018 | — | 1B/2B |
| Ctr2-2 | 9-10/17 | Nov. 7, 2017 | 31.5 | — | May 21, 2018 | — | 2B |
| Ctr2-3 | 9-10/17 | Nov. 7, 2017 | 31.3 | — | May 21, 2018 | — | * |
| Ctr2-4 | 9-10/17 | Nov. 7, 2017 | 28 | — | May 21, 2018 | — | * |

* practice coupon; coating was not fully penetrated by the cutter teeth

All the details for the specimens tested, including laser-interference conditions and the results for coating adhesion testing for the three batches of 85582 spray coatings on laser-structured panels are summarized in Tables 12-14. The results coating adhesion testing of controlled specimens, which were prepared with chemical conversion coating (CCC) according to MIL-DTL-5541 type I (with hexavalent Cr) are shown in Table 14.

Table 12 shows the first batch of 85582 coating on 2×2 in Al panels (paint conditions: humidity 22%, Temp. 21 C, spray gun pressure 20 psi).

TABLE 12

| ID | Laser speed [mm/s] | LIS date | Coating date | Thickness Ave. coating [um] | X-cut date | Cross-hatch date | X-cut scale | Cross-hatch scale |
|---|---|---|---|---|---|---|---|---|
| B1-1 | 10 | Apr. 13, 2018 | Apr. 17, 2018 | 20.5 | — | May 21, 2018 | — | 5B |
| B1-2 | 10 | Apr. 13, 2018 | Apr. 17, 2018 | 20.2 | — | May 21, 2018 | — | 5B |
| B1-13 | 4 | Apr. 13, 2018 | Apr. 17, 2018 | 21.8 | — | May 21, 2018 | — | 5B |
| B1-14 | 4 | Apr. 13, 2018 | Apr. 17, 2018 | 20.8 | — | May 21, 2018 | — | 5B |

Table 13 shows the second batch of 85582 coating on 2×2 in Al panels (paint conditions: humidity 22%, Temp. 21 C, spray gun pressure 20 psi).

TABLE 13

| ID | Laser speed [mm/s] | LIS date | Coating date | Thickness Ave. coating [um] | X-cut date | Cross-hatch date | X-cut scale | Cross-hatch scale |
|---|---|---|---|---|---|---|---|---|
| B1-3 | 10 | Apr. 13, 2018 | Apr. 17, 2018 | 31.6 | — | May 21, 2018 | — | 5B |
| B1-4 | 10 | Apr. 13, 2018 | Apr. 17, 2018 | 34.2 | — | May 21, 2018 | — | 5B |
| B1-15 | 4 | Apr. 13, 2018 | Apr. 17, 2018 | 33.2 | — | May 21, 2018 | — | 5B |
| B1-16 | 4 | Apr. 13, 2018 | Apr. 17, 2018 | 29.7 | — | May 21, 2018 | — | 5B |

Table 14 shows the first batch of 85582 controlled specimens coated on 4×6 in Al panels at M & P Solutions facilities.

TABLE 14

| ID | CCC date | Coating date | Thickness Ave. coating [um] | X-cut date | Cross-hatch date | X-cut scale | Cross-hatch scale |
|---|---|---|---|---|---|---|---|
| Ctr8-1 | 9-10/17 | Nov. 7, 2017 | 16.7 | — | May 21, 2018 | — | 3B |
| Ctr8-2 | 9-10/17 | Nov. 7, 2017 | 19.9 | — | May 21, 2018 | — | 3B |
| Ctr8-3 | 9-10/17 | Nov. 7, 2017 | 17.6 | — | May 21, 2018 | — | 4B |
| Ctr8-4 | 9-10/17 | Nov. 7, 2017 | 19.7 | — | May 21, 2018 | — | 3B |
| Ctr8-5 | 9-10/17 | Nov. 7, 2017 | 32.5 | — | May 21, 2018 | — | * |
| Ctr8-6 | 9-10/17 | Nov. 7, 2017 | 31 | — | May 21, 2018 | — | * |
| Ctr8-7 | 9-10/17 | Nov. 7, 2017 | 32.6 | — | May 21, 2018 | — | 5B |
| Ctr8-8 | 9-10/17 | Nov. 7, 2017 | 31 | — | May 21, 2018 | — | * |

* practice coupon; coating was not fully penetrated by the cutter teeth

Figure 13:
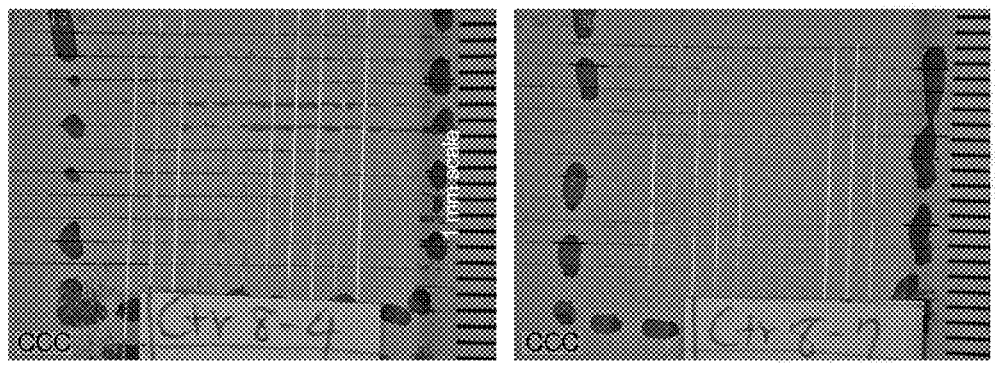
FIG. 13 shows pictures of panels after cross-hatch tests for coated unstructured control 85582 specimens.
Figure 14:
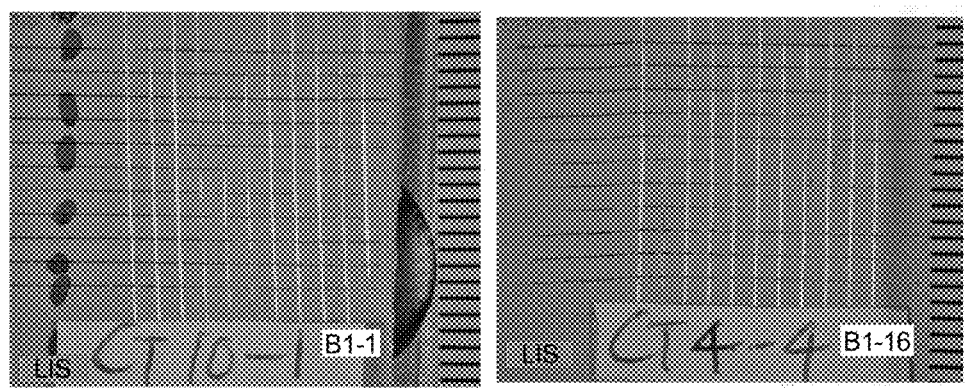
FIG. 14 shows pictures of coated laser-interference structured panels after cross-hatch tests for thick coating specimens B1-1 and B1-16.

Pictures of cross-hatch adhesion testing of controlled specimens, which were prepared with chemical conversion coating (CCC) according to MIL-DTL-5541 type I (with hexavalent Cr) are shown in FIG. 13 for the 85582 coating. Pictures of laser-structured panels after cross-hatch tests coating adhesion testing are shown in FIG. 14 for thick coating specimens B1-1 and B1-16 having the 85582 coating. Unlike for the 23377 coating, the cross-hatch for the 85582 coating indicate a slightly lower coating adhesion ranking for thinner coating specimens than for the thicker coating specimens. While the coating adhesion for the thicker coating specimens is very good for both the baseline (control specimens) and laser-interference structured specimens, the coating adhesion for the thinner coating specimens is better for the laser-interference structured specimens, but lower than that for the LIS thick coating specimens.

The above data illustrate a feature of the invention wherein the open period—the time period between the date of surface preparation and the date that the coating is applied, can be extended for several months. In other surface preparation techniques, coating must occur within days or even hours after surface preparation. The anti-corrosion characteristics that are imparted by the laser interference treatment permit extended periods of time to pass before coating occurs, which improves the logistics of assembling article.

A system for preparing a surface of an article for a coating includes an interference laser system configured such that an original laser beam is split into at least 2 beams which are then refocused over the same spot on a surface portion of the article to create an interference laser-treated surface portion on the article, and a series of features comprising depressions or channels is created. A registration device registers the position of the interference laser system relative to the surface processed. A drive moving at least one of the interference laser system and the surface relative to each other to apply features to the surface portion of each component.

This invention can be embodied in other forms without departing from the spirit or essential attributes thereof. Accordingly, reference should be made to the following claims to determine the scope of this invention.

We claim:

1. A method of making a coated article, comprising the steps of:
   laser ablating a substrate surface of a first substrate of the article with an interference laser at a plurality of spots to create an interference laser-treated surface portion, wherein a laser spot size is from 2 to 8 mm and the interference laser ablating comprises providing between 1-50 laser pulses per laser spot and translating the laser spot with speeds between 1 to 2000 mm/s, wherein the laser ablating removes portions of the substrate surface to generate interference laser-treated surface ridge features, wherein the ridge features have a periodicity between 0.5-50 μm, and the periodicity varies by no more than ±5%; and
   applying a coating over the interference laser-treated surface portion.

2. The method of claim 1, wherein the interference laser is a multi-beam interference laser, and wherein an original laser beam is split into at least 2 beams which are then refocused over the same area on the substrate surface.

3. The method of claim 1, wherein the wavelength of light produced by the interference laser is 180-2000 nm.

4. The method of claim 1, wherein the coating is a primer layer, and further comprising a second coating adhered to the coating layer.

5. A method for fabricating an article, the method comprising:

laser ablating a substrate surface of a first substrate of the article with an interference laser at a plurality of spots to create an interference laser-treated surface portion, wherein a laser spot size is from 2 to 8 mm and the interference laser ablating comprises providing between 1-50 laser pulses per laser spot and translating the laser spot with speeds between 1 to 2000 mm/s, wherein the laser ablating removes portions of the substrate surface to generate interference laser-treated surface ridge features, wherein the ridge features have a periodicity between 0.5-50 µm, and the periodicity varies by no more than ±5%;

applying a first coating over the interference laser-treated surface portion;

laser ablating a surface portion of a second substrate of the article with the interference laser at a plurality of spots to create an interference laser-treated surface portion, wherein a laser spot size is from 2 to 8 mm and the interference laser ablating comprises providing between 1-50 laser pulses per laser spot and translating the laser spot with speeds between 1 to 2000 mm/s, wherein the laser ablating removes portions of the substrate surface to generate interference laser-treated surface ridge features, wherein the ridge features have a periodicity between 0.5-50 µm, and the periodicity varies by no more than ±5% to create a second laser-treated surface portion;

applying a second coating to the second laser-treated surface portion; and applying an adhesive between the first coating and the second coating; and joining the first substrate to the second substrate with the first coating, adhesive, and second coating there between.

6. The method of claim 5, wherein the interference laser-treated surface portion of the substrate and the interference laser-treated surface portion of the second substrate are dissimilar materials.

* * * * *